US012046179B2

(12) United States Patent
Dachsbacher et al.

(10) Patent No.: US 12,046,179 B2
(45) Date of Patent: Jul. 23, 2024

(54) COLOR DISPLAY IN IMAGE SEQUENCES ON PHYSICAL DISPLAYS

(71) Applicant: KARLSRUHER INSTITUT FÜR TECHNOLOGIE, Karlsruhe (DE)

(72) Inventors: Carsten Dachsbacher, Pfinztal (DE); Emanuel Schrade, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 94 days.

(21) Appl. No.: 18/047,140

(22) Filed: Oct. 17, 2022

(65) Prior Publication Data

US 2023/0137267 A1 May 4, 2023

Related U.S. Application Data

(63) Continuation of application No. PCT/EP2021/059676, filed on Apr. 14, 2021.

(30) Foreign Application Priority Data

Apr. 17, 2020 (EP) .................................... 20170024

(51) Int. Cl.
*G09G 3/20* (2006.01)
(52) U.S. Cl.
CPC ... *G09G 3/2003* (2013.01); *G09G 2320/0242* (2013.01); *G09G 2320/0666* (2013.01);
(Continued)
(58) Field of Classification Search
CPC ......... G09G 3/2003; G09G 2320/0242; G09G 2320/0666; G09G 2320/10;
(Continued)

(56) References Cited

U.S. PATENT DOCUMENTS

2013/0147896 A1* 6/2013 Cook ...................... H04N 7/142
                                                    348/14.1
2014/0022460 A1* 1/2014 Li ............................. G06T 5/92
                                                    348/708
(Continued)

FOREIGN PATENT DOCUMENTS

EP          0723363 A2      7/1996
KR       20050059522 A      6/2005

OTHER PUBLICATIONS

International Search Report and Written Opinion for PCT Application No. PCT/EP2021/059676, mailed on Jul. 6, 2021, 10 pages.
(Continued)

*Primary Examiner* — Jitesh Patel
(74) *Attorney, Agent, or Firm* — Brake Hughes Bellermann LLP

(57) ABSTRACT

Techniques are described for enhancing the perceived gamut (PG) of a physical display device presenting frames of an image sequence to a human viewer wherein the gamut (DG) of the display device is given by the primary colors of the display device. An interface receives a sequence of frames from an image sequence source with each frame having input color data associated with each pixel of the respective frame. A white point computation module computes frame-specific target white points (TWP) to which the viewer would adapt when watching a respective frame on a display capable of showing all perceivable colors. A chromatic adaptation transformation module applies a temporal filter function to the target white points of all frames within a sliding window to compute a filtered white point and applies a chromatic adaptation transformation to one or more future frames by using the filtered white point.

20 Claims, 16 Drawing Sheets

(52) U.S. Cl.
CPC ..... *G09G 2320/10* (2013.01); *G09G 2340/06* (2013.01); *G09G 2340/16* (2013.01)

(58) Field of Classification Search
CPC .......... G09G 2340/06; G09G 2340/16; G09G 2320/0247; G09G 5/02; H04N 1/6086
See application file for complete search history.

(56) References Cited

U.S. PATENT DOCUMENTS

| | | | |
|---|---|---|---|
| 2014/0111537 A1* | 4/2014 | Peng | G09G 5/02 345/590 |
| 2014/0233914 A1 | 8/2014 | Williams | |
| 2016/0335782 A1* | 11/2016 | Sundaresan | G06T 15/506 |
| 2018/0220144 A1* | 8/2018 | Su | H04N 19/70 |
| 2018/0288382 A1* | 10/2018 | Kring | H04N 21/42204 |
| 2020/0150221 A1 | 5/2020 | Prados et al. | |

OTHER PUBLICATIONS

M. Fairchild et al.: "Time course of chromatic adaptation for color-appearance judgments," J. Opt. Soc. Am. A, vol. 12, No. 5, May 1995, pp. 824-833.
E. Land et al.: "Lightness and Retinex Theory," Journal of the Optical Society of America, vol. 61, No. 1, Jan. 1971, pp. 1-11.
M. Luo et al.: "CIECAM02 and Its Recent Developments", Advanced Color Image Processing and Analysis, Fernandez-Maloigne, C. (ed.), 2013, pp. 19-58.
N. Moroney et al.: "The CIECAM02 color appearance model," Society for Imaging Science and Technology, Color and Imaging Conference, Nov. 12, 2002, 7 pages.
O. Rinner et al.: "Time course of chromatic adaptation for color appearance and discrimination", Vision Research, vol. 40, No. 14, 2000, pp. 1813-1826.
G. Ward: "Picture Perfect RGB Rendering Using Spectral Prefiltering and Sharp Color Primaries," Thirteenth Eurographics Workshop on Rendering, 2002, 8 pages.
A. Wilkie et al.: "A Robust Illumination Estimate for Chromatic Adaptation in Rendered Images," Eurographics Symposium on Rendering 2009, vol. 28, No. 4, 2009, 9 pages.

* cited by examiner

COLOR DISPLAY IN IMAGE SEQUENCES ON PHYSICAL DISPLAYS

CROSS REFERENCE TO RELATED APPLICATIONS

This application claims priority to, and is a continuation of, PCT/EP2021/059676 filed on Apr. 14, 2021, and entitled "Perceptually Improved Color Display in Image Sequences on Physical Displays," which in turn claims priority to EP Application No. 20170024.2 filed on Apr. 17, 2020, both of which are hereby incorporated by reference in their entireties.

TECHNICAL FIELD

The present description generally relates to electronic data processing, and more particularly, relates to methods, computer program products and systems for enhancing the perceived display gamuts of physical displays when displaying the image frames of an image sequence.

BACKGROUND

Display devices can produce a certain set of colors, the so-called display gamut, which depends on the primary colors used in the display. Often this gamut covers only a fraction of the colors given in an input signal. For example, the color information in an image sequence (e.g., frames of a movie or a dynamic sequence of frames for virtual reality scenes) typically includes colors which lie outside the gamut of the display device. That is, such colors cannot be reproduced by the respective physical display due to the limited gamut of the display device although they could be recognized by the human eye if they could be actually generated by the respective display. As a consequence, the color richness in image sequences displayed on physical display devices is below the color richness of colors actually coded in the respective frames of the image sequence which leads to an inferior color experience for the observer/viewer of the image sequence when compared to the color experience of the human eye observing a scenery in nature or on an ideal, yet not realizable, display.

The gamut, i.e. the set of possible color stimuli, of a display is given by its primary colors (typically red, green, and blue) and, thus, is a fixed and decisive device characteristic. Often the gamut is a limiting factor when displaying images or image sequences with saturated colors. Colors outside the display gamut (but within the color range perceivable by the human eye) are mapped to less saturated colors inside the gamut leading to a less rich color perception by the viewer than provided for by the color information available in the frames of the image sequence.

SUMMARY

There is therefore a need to provide systems and methods for displaying frames of an image sequence on physical display devices with improved perceived colors for human viewers. In particular, there is a need to provide such systems and methods also for image sequences which are generated dynamically (e.g., in computer games or virtual reality applications).

The colors that humans actually perceive on the display also depend on chromatic adaptation, which is a property of the human visual system (HVS) that describes the adaptation of color perception to the surrounding through adaptation of cells in the human eye as well as in the following signal processing through to the human brain. In nature it allows humans to perceive colors of objects similarly even if the illuminating light source changes (e.g. from about 2000 Kelvin at sunrise to a slightly blue color with approximately 8000 Kelvin outdoors in shade).

This chromatic adaptation in the HVS also occurs when watching images, animations, and image sequences on a display. It can be characterized by the white point to which an observer is adapted. The so-called chromatic adaptation transformation (CAT) can then be used to determine how color stimuli generated by the display are perceived by the human. The adaptation process has been intensively studied and happens at different stages of the HVS. Adaptation speeds in the HVS can be modeled as exponential functions. While more than 60% of the chromatic adaptation happens instantaneously (i.e., in less than 20 ms), full chromatic adaptation may take up to 120 seconds. It is to be noted that the chromatic adaptation is different from brightness adaptation where the adaptation involves the pupil of the human eye (changing the size of the translucent area), whereas chromatic adaptation occurs via cone cells of the human eye and signal processing by human cells.

Chromatic adaptation has two consequences: firstly, the perception of a certain color stimulus generated by the display is not always the same. And secondly, perceived colors may lie outside the actual display gamut of the display device (as perceived when the viewer is adapted to the display white point). For example, a color stimulus is perceived more saturated when the viewer is adapted to a white point shifted towards the complementary color of the color stimulus. This effect is used herein to enhance the range of colors which are perceived by an observer.

Chromatic adaptation is a continuously ongoing process which depends on the visual stimuli of the HVS. The well-established color appearance model CIECAM02, among others, allows to calculate how a displayed color stimulus is perceived when the viewer is adapted to a specific white point. The adapted white point (i.e. the white point an observer is adapted to) depends on the history of viewed color stimuli. Other color appearance models may as well be used by the skilled person for computing the color perception of a viewer.

Experiments show that the influence of a viewed color on the subsequently changing adapted white point can be modeled by a sum of exponential functions. The part of the field of view that has an influence on adaptation—the adapting field—extends to the whole field of view. The viewer adapts to the viewed stimuli that, in the real world, are typically determined by the color of the light source. In an image, this color can be approximated for example by the average color of all pixels (using the gray world assumption) or by the pixel with maximum intensity (assuming specular reflection of the light source by a surface). In short, the adaptation of the human eye can be modeled by computing the white point and the speed of adaptation. As used herein, a frame-specific target white point is the white point to which the viewer would adapt when watching the particular frame on a display capable of showing all perceivable colors. Further methods for computing a frame-specific target white point are known, including computing the frame-specific white point as given by the Retinex theory, or computing the frame-specific white point using local shifts.

The herein disclosed concepts allow to generate a modified image sequence which is perceived by a human viewer with a higher degree of completeness with regards to the color representation of the input color data as coded in the image. To achieve this effect, the disclosed system and method do not only account for the chromatic adaptation to reproduce colors faithfully, but actively steer the adaptation to extend the perceived display gamut of a viewer beyond the display's physical capabilities.

The system computes the target white points of each frame (i.e. the white point to which the user would adapt when watching the respective frame on a display capable of showing all perceivable colors), and applies a temporal filter function to a plurality of white points associated with frames within a sliding window that comprises the current frame (the frame which is the current output to the display device). The temporal filter function models the chromatic adaptation over the sequence of frames and computes a filtered white point for the current frame as a weighted sum of all white points associated with the sliding window. The weights of the temporal filter function determine how strong the various white points of the current, past and future frames are influencing the filtered white point and are also chosen to steer the filtered white point such that it is ideal for reproducing the input colors in the subsequent frames of the image sequence (possibly including input colors outside the display gamut). The weights are thereby chosen in such way that the white points of the past and current frames receive weight values with a first sign which counteract the adaption to the white points of the past and current frames, and the white points of the future frames receive weights with a second sign to preventively adapt the viewer's perception of the display white point towards the white points of the future frames. The first and second signs are opposite. For example, weight values associated with white points of past and current frames may receive negative weights, and the weight values associated with white points of future frames may receive positive weights because it is intended to counteract the adaptation of the user to past frames and to preventively adapt the user to perceive the display white point similar to the white points of future frames for better utilizing the available gamut in the future frames. The filtered white point is then used as the white point for a chromatic adaptation transformation of one or more future frames. The sliding window is then shifted either to the next frame, or in cases where the transformation is applied to more than one future frame, to the last transformed frame. It is to be noted that the signs associated with white points of past/current frames and future frames can also be chosen the other way round if the subsequent color transformation is adjusted accordingly.

The chromatic adaptation transformation using the filtered white points modifies the displayed colors in the image sequence in a manner hardly noticeable or even not noticeable at all by the human viewer but bringing the observers adaptation closer to the ideal white point—eventually extending the gamut of perceived colors in the image sequence. The chromatic adaptation transformation is performed in the LMS color space. LMS is a color space which represents the response of the three types of cones of the human eye, named for their responsivity (sensitivity) peaks at long, medium, and short wavelengths. The numerical range is generally not specified, except that the lower end is generally bounded by zero. It is common to use the LMS color space when performing chromatic adaptation transformations for estimating the appearance of a sample under a different illuminant. Typically, the colors to be adapted chromatically (i.e., the input colors) are specified in a color space other than LMS (e.g. sRGB). The chromatic adaptation can be computed by a von Kries transform and operates on tristimulus values in the LMS color space. Every color perception of the HVS can be described in the LMS color space, and colors defined in other color spaces can be transformed into the LMS color space.

In one embodiment, a computer-implemented method is provided for enhancing the perceived gamut of a physical display device, and for more accurately reproducing input colors when presenting frames of an image sequence to a human viewer. It is to be noted that the term "enhancing the perceived gamut" relates to the physiological effect that the human viewer actually perceives more saturated colors than the maximum color saturation which can be generated by the physical display. The display gamut of the display device is defined by the primary colors of the display device. The primary colors define the reproducible colors of the display device. Most display devices support three primary colors. Some devices support four or even more primary colors. It is to be noted that a physical display gamut could be expanded to cover a broad range of natural colors by further increasing the number of primary colors. However, the skilled person understands that this would dramatically reduce the resolution of the display and is therefore typically not an option to improve color perception on real-world display devices.

The following steps of the computer implemented method can be executed by a computer system which implements respective functional modules. In a first step, a sequence of frames is received from an image sequence source. Such an image sequence source can be a video file which is available in the form of an appropriate data structure, a media player configured to play such video file, a video camera providing a video live stream, a computer game or virtual reality application generating a video output for the user, etc. It is to be noted that image sequence sources may provide an image sequence which is entirely predefined, such as for example, a movie stored on a media storage device. On the other hand, some image sources may provide dynamic videos where future frames are generated in a context-dependent manner, such as for example, the video output of computer games where the following scene depends on the interaction of the user with the game, or virtual and augmented reality scenes which depend on the user's movements. It is to be noted that the herein disclosed concept is able to perform the entire chromatic adaptation transformation of the frames of the received image sequence in real-time.

In one embodiment, in case of dynamic image sequences, the computer system may include an extrapolation module which allows to predict white points of future frames. Such frames may be dynamically generated, for example, by a computer game or by a virtual reality application. In general, such future white points can be computed by extrapolation of future images and a subsequent computation of the white point of the future image, or by a direct extrapolation of the white point itself.

For example, the extrapolation of an entire image may be achieved by image processing steps with the so-called optical flow. In this implementation, the system searches for blocks of pixels which move across the image. From position changes of such blocks in the past, a future position is predicted. Alternatively, the movement of objects (e.g., in a virtual 3D scene) may be extrapolated/predicted based on transformation matrices and the computation of a corresponding image of the scene. However, the prediction of entire frames is computationally expensive and the disclosed method only needs the white points associated with such predicted frames and not the entire image information.

Therefore, it may be advantageous and more efficient to extrapolate only the white points associated with the future frames as only such white points are required to perform the herein disclosed methods. In more detail, the white points of previous (past) frames are directly used to extrapolate the white points of one or more future frames. For the white point extrapolation different functions may be used depending on the expected development. For example, a linear function may be used for extrapolation if the color smoothly shifts towards a particular target color (e.g., in a sunset or sun rise scene). A spline function may be defined which provides an approximated color shift behavior through the past white points (e.g., for scenes with some color oscillation). One could also train a neural network to learn color shift patterns and use the trained neural network for white point prediction of future frames.

Each frame of the received frame sequence has input color data associated with each pixel of the respective frame. The input color data is defined in a specific color space. That is, in a given color space each input color value describes an unambiguous color stimulus for a human viewer. In other words, when the image sequence is recorded or generated, for each pixel of each frame the input color of the pixel is stored as part of the frame data. The input color is a color representation from which a unique color stimulus results for the human viewer. It is to be noted that, for the skilled person, it is clear that the above mentioned transformation of the input data color space into the LMS color space is an implicit feature of the transformation which can be performed at various points in the claimed method. For example, the LMS color space transformation can be directly applied to the received frames before any further processing occurs. For the final presentation of the transformed frames on the physical display the pixel colors are transformed into the color space of the physical display. Such transformations between the various color spaces are well known in the art.

The system can then compute, in the LMS color space, for each frame of the image sequence a frame-specific target white point. In other words, if the image sequence could be displayed on a display which is capable to show all colors perceivable by the human eye and the following signal processing in the HVS, then the adaptation would occur in relation to the white points of the images based on the original input color values in an image (referred to as target white points herein).

A white point in general (often referred to as reference white or target white in technical documents) is a chromaticity value that serves to define the color "white" in image capture, encoding, or reproduction. Depending on the application, different definitions of white are needed to give acceptable results. For example, images taken indoors may be lit by incandescent lights, which are relatively orange compared to daylight (i.e., with a lower color temperature). Defining "white" as daylight will give unacceptable results when attempting to color-correct an image taken with incandescent lighting. An illuminant (light source) is characterized by its relative spectral power distribution (SPD). The white point of an illuminant is given as the chromaticity of a white object, reflecting all wavelengths equally, under the illuminant, and can be specified by chromaticity coordinates, such as the x, y coordinates on the CIE 1931 chromaticity diagram (the white point is only related to chromaticity and unaffected by brightness).

The white point to which an observer is adapted depends on the history of viewed color stimuli. The adaptation behavior of the human viewer is known from experiments. The viewer adapts to the viewed stimuli that, in the real world, are typically determined by the color of the light source. When viewing an image, the color to which the viewer adapts (the frame-specific target white point for the image) can be approximated for example by the average color of all pixels (using the gray world assumption) or by the pixel with maximum intensity (assuming specular reflection of the light source by a surface). Being adapted to a white point w means that the viewer perceives w as white. Experimentally it has been shown that the perception of colors changes with the adapted white point and there are several chromatic adaptation transformations (CATs) for modelling the relation of stimuli and perceived colors.

Based on the history of frames up to a particular current frame, a filtered white point can be computed for the subsequent frame (the frame following the current frame) by taking into account the history but also the development of the white point in future frames. The term "filtered white point" as used herein refers to the white point which is determined by applying a temporal filter function to past, current and future white points in accordance with the corresponding time range of the temporal filter. Methods for computing how the viewer adapts when watching the image sequence are well known in the art. For example, it can be computed as a sum of exponentially-weighted white points of the image frames. In case the input color data is not in the LMS color space, a corresponding transformation of the color space is executed beforehand as described earlier.

The chromatic adaptation transformation with a filtered white point applied to the one or more future frames manipulates the color of every pixel in such frames to benefit from the adaptation in relation to the currently adapted white point and the resulting perceived colors. This increases the range of perceived colors for the human viewer to reproduce the perceived colors more closely compared to an ideal display. In other words, the colors of the pixels of such future frame(s) are manipulated to benefit from the steered adaptation, which is described by the filtered white point. Applying chromatic adaptation transformation based on the filtered white points to manipulate the adaptation of the user can be seen as implementing a guided (or steered) adaptation for the user where the filtered white points implement such manipulation. The range of the resulting perceived colors for the human viewer when watching the image sequence increases, and gets closer to that of an ideal display (without display specific gamut limitations). Of course, ideally the manipulation should not be recognizable by the human user. For this purpose, the disclosed method proposes a particular advantageous design of the temporal filter function.

This advantageous design is based on a progression of adaptation. However, a person skilled in the art may use any other suitable chromatic adaptation model. In this embodiment, the weight values of the temporal filter are directly extracted from the progression of adaptation as defined by the formula $$f(t) = \sum_{i=0}^{1} N_i e^{-\alpha_i t}, \alpha_i = \frac{\ln(2)}{T_i},$$

with f(t) describing how the white point of a currently observed frame affects the adapted white point in t seconds. Here, $N_i$ denotes the fraction of influence the exponential has on the adaptation and $T_i$ is the half-life, i.e. the influence of a white point viewed $T_i$ seconds ago is half of the initial influence, where i=0 refers to fast adaptation, and i=1 refers to slow adaptation, respectively.

The adapted white point at a particular point in time $t_c$ may be considered to be the sum of the white points observed in the past at points in time $t_p$ (with $t_p<t_c$) weighted with $f(t_c-t_p)$, as each of the past white points has an impact and the impact only depends on the elapsed time between the corresponding past frame(s) and the current frame at time $t_c$. In other words, the portion of the temporal filter extending from the current frame to past frames computes the currently adapted white point with the filter weight values $f(t_c-t_p)$ for $t_p<t_c$. The portion of the temporal filter extending to the future frames has a similar motivation. The impact of the white point associated with the current frame on the adapted white point at $t_f>t_c$ is $f(t_f-t_c)$. Ideally, the observer should be adapted for each frame such that the display white point is perceived as the frame-specific (target) white point. Because then most colors of the image of said frame can be mapped to the display gamut without introducing errors to the perceived colors.

The time range covered by the temporal filter can vary. A time range in the order of [−8 s, 8 s] may be convenient. However, it needs to be taken into account that, the larger the time range, the more future frame white points are needed. This may become critical in applications with dynamic frame generation, where the white points of future frames need to be predicted. Of course, in case a shorter time range is chosen for the temporal filter, the system can react to future color changes only at a later point in time (when compared to a larger time range). When changing the time range of the temporal filter, it may be useful to scale the weight values so that during the shorter time range a stronger impact on the adaptation may be achieved. For example, for this purpose, the weight values may be multiplied with a factor larger than 1. Scaling the weights in order for the HVS to adapt faster has the downside of increasing the perceived error in the images displayed to steer the adaptation. It is to be noted that the time range covering the past frames can be different from the time range covering the future frames, thus leading to an asymmetric temporal filter function with regards to the point in time representing the current frame. For example, the temporal filter may cover a time interval [−8 s, 5 s].

The sliding window duration (i.e., the time range of the temporal filter) is chosen to cover a significant time-span of the chromatic adaptation of the HVS. The slower part of chromatic adaptation has a half-life of approximately 30 sec. Any sliding window duration in the order of this half-life time can be used. When using a larger window duration (and therefore a corresponding higher number of frames) the chromatic adaptation is more accurately taken into account leading to slightly improved results. But also shorter window durations, such as for example five seconds, already cover a large part of the adaptation because of its exponential decay. A person skilled in the art can therefore select a suitable duration of the sliding window which provides a good compromise between additional computation time and further potential improvement of the result.

For the chromatic adaptation transformation using the filtered white point, for example, a von Kries transform can be used to obtain transformed pixel colors from the original input colors. The obtained transformed colors can then be mapped to the display gamut of the physical display device (e.g., through clamping). At this point, the limited display capabilities of the physical display can be taken into account.

The temporal filter function is advantageously designed to minimize the error which reflects the difference between the computed perceived colors of the respective window frame and the colors which would be shown by an ideal display device. In other words, the error is a measure for the distance between the colors of the image as they would be perceived by the human observer on a display without gamut constraints (i.e. an ideal display) and the actually displayed colors as they are perceived by a human observer. Minimizing this error by using the temporal filter function allows to convey a more natural color experience to the human viewer. The minimization of the determined error is achieved by updating the chromatic adaptation transformation for all window frames with the filtered white points and the von Kries transforms.

Once the current sliding window has been processed as described, one or more frames following the current frame are ready for output to the physical display in the color space of the physical display. The corresponding transformation from LMS color space to physical display color space is well known by the person skilled in the art. The sliding window is shifted by a predefined number of n frames as described earlier.

The smooth transition of the white point which is achieved through the temporal filter function is typically not recognizable by the human viewer and minimizes color artifacts in the displayed image sequence despite of the manipulated (or steered) chromatic adaptation transformation. And yet, because of the shifted (adjusted) white points (i.e. shifted perceived display gamuts) the human viewer is able to perceive otherwise not displayable colors like or at least closer to the original input colors. In cases where an adjustment is not possible to include all the original input colors in the modified perceived display gamuts, at least a more realistic color perception is achieved because of the shift of the adjusted perceived display gamut towards the original input colors.

In one embodiment, a computer program product is provided comprising instructions that, when loaded into a memory of a computing device and executed by at least one processor of the computing device, execute the method steps of the computer implemented method as disclosed herein.

In one embodiment, a computer system is provided for enhancing the perceived gamut of a physical display device presenting frames of an image sequence to a human viewer wherein the gamut of the display device is given by the primary colors of the display device. The system has a memory to load said computer program product, and has one or more processors to execute said program. The program implements modules of the system which allow the system to execute the functions which perform the method steps of the herein disclosed computer implemented method.

Further aspects of the description will be realized and attained by means of the elements and combinations particularly depicted in the appended claims. It is to be understood that both, the foregoing general description and the following detailed description are exemplary and explanatory only and are not restrictive.

SHORT DESCRIPTION OF THE FIGURES

FIG. 1A includes a block diagram of a computer system for enhancing the perceived gamut of a physical display device according to an embodiment;

DETAILED DESCRIPTION

Figure 1A:
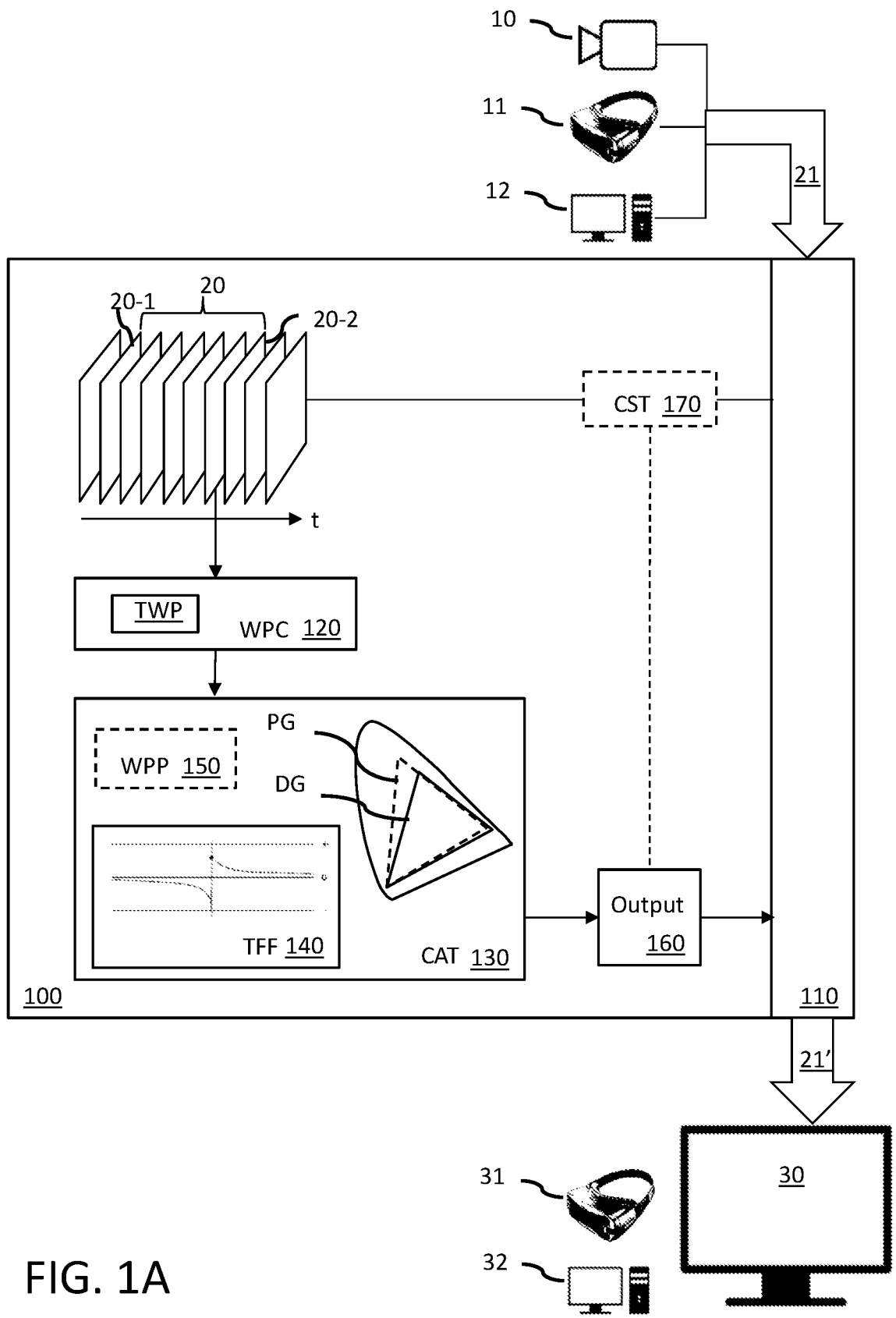
FIGS. 1B, 1C illustrate two different embodiments of a temporal filter function which may be used by the computer system.
Figure 2:
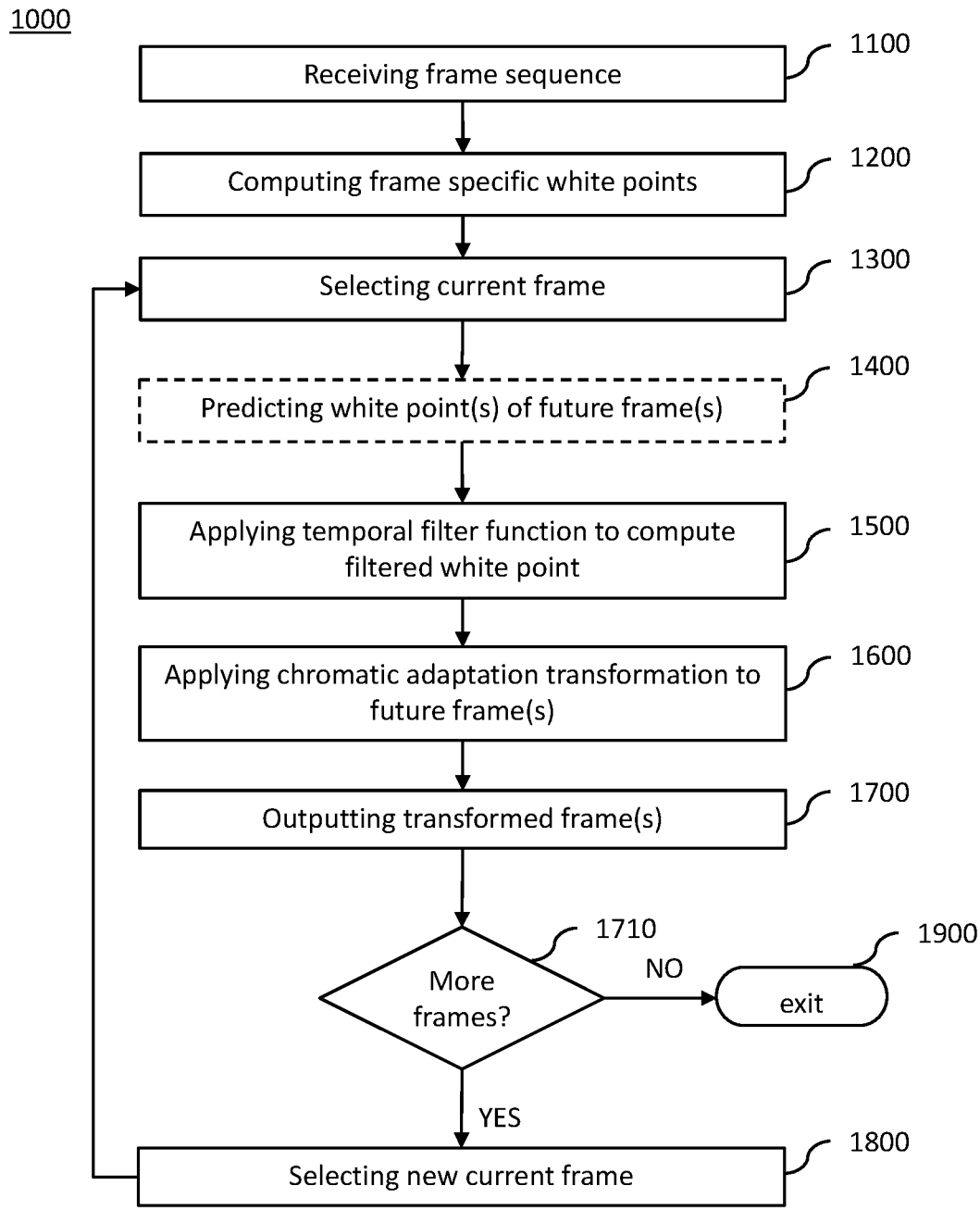
FIG. 2 is a simplified flow chart of a computer-implemented method for enhancing the perceived gamut of a physical display device according to an embodiment.

FIG. 1A illustrates a block diagram of an example embodiment of a computer system 100 for enhancing the perceived gamut (PG) of a physical display device 30, 31. The output may also be stored as a processed image sequence in a corresponding storage device for later display on a physical display (e.g. a monitor of a computer 32 including the storage device), or for further image processing tasks. The display device displays a modified image sequence 21' which is based on an image sequence 21 provided by an image sequence source 10, 11, 12. FIG. 2 is a simplified flow chart of a computer-implemented method 1000 for enhancing the perceived gamut (PG) of a physical display device according to an embodiment. The method 1000 of FIG. 2 is executed by the computer system 100. The description of FIG. 1A refers to the method steps illustrated in FIG. 2. For this reason, reference numbers of FIG. 1A and FIG. 2 are referred to in the following description.

The computer system 100 is communicatively coupled with an image sequence source 10, 11, 12 via the interface 110. Further, the system 100 is communicatively coupled with a physical display device 30, 31 or with an image processing or storage device 32 via the interface 110. The coupling is implemented via standard communication protocols which allow to receive and output image sequences 21, 21'. For example, the image sequence source can be a media player playing a video file provided on a computer 12, or a video stream provided by a video camera or a media player 10, or a computer game 12 or virtual reality application 11 or any other application producing a sequence of output images 21 generating a video output for the user, etc. The physical display device can be any monitor device capable of displaying image sequences to a human viewer. This also includes virtual/augmented reality displays 31 which are available, for example, as virtual reality glasses.

The limitations of such physical display devices with regard to the limited range of colors which can be reproduced by such devices have been discussed at length above. The computer system 100 can enhance the perceived gamut PG of the physical display device 30, 31 when presenting frames of an image sequence to a human viewer. The color space of the physical display device corresponds to the (display) gamut DG of the display device and is given by the primary colors of the display device.

The interface 110 receives 1100 a sequence 21 of frames from the image sequence source 10, 11, 12. Each pixel of each frame has input color data given in a specified input color space. That is, in the color space the input colors describe unambiguous color stimuli for a human viewer. However, the physical display may not be capable to display each of such perceivable color stimuli because the colors generated by the components of the display (e.g., LEDs) typically cannot reach color saturation levels as they would still be perceivable by the human viewer.

Figure 3:
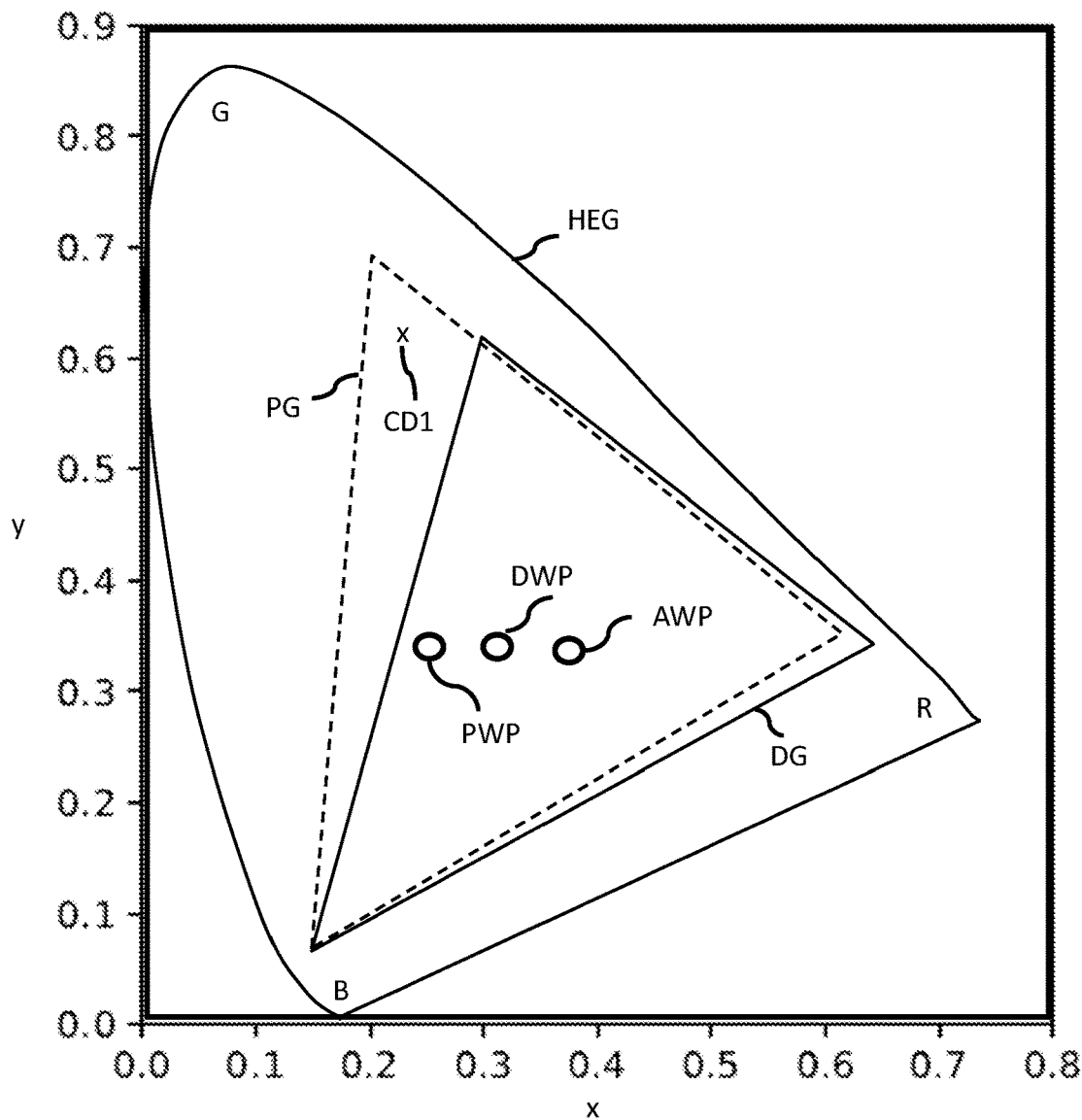
FIG. 3 illustrates the gamut of a human being in comparison to a device gamut and a perceived gamut of the device.

The computer system 100 takes benefit from the physiological effect of chromatic adaptation which occurs when a human viewer watches certain colors for a certain time. The human eye and the processing of the color information by the HVS leads to the effect that the adapted white point of the human viewer depends on the history of the viewed images. This adaptation leads to the effect that the perceived gamut of the physical display is shifted. Turning briefly to FIG. 3, the shape HEG illustrates the human eye gamut in a chromaticity diagram with all perceivable colors in the range blue B, red R, and green G. The triangle DG illustrates the display gamut of the physical display device. In this example, three primary colors define the color space of the physical device. If more than the three primary colors are used, the device gamut DG can become a polygon spanning a larger gamut.

In the example, only colors within the triangle DG can be displayed by the physical display device. The color data CD1 is outside the display gamut DG. The saturation level towards the green color cannot be reproduced by the physical display. The white point DWP associated with the display gamut DG is shown as a black bullet. When the viewer (user, observer) watches a certain image sequence on the display device the chromatic adaptation of the viewer leads to a shift of the white point to the adapted white point AWP dependent on the color composition in the image sequence. In the example, the adapted white point AWP is shifted towards red R. Therefore, the viewer would perceive every color within the display gamut DG more blueish and greenish than actually displayed. This leads to a shift of the perceived display gamut PG vs. the display gamut DG towards the colors with a higher saturation level of green G. That is, the perceived gamut PG (illustrated as dashed triangle) is shifted so that the color value CD1 falls into the perceived gamut. In other words, the viewer adapted to AWP can perceive the color value CD1 although the physical display device is not capable to display this color. The computer system 100 uses this effect to shift the adapted white point for the user to a position where the user gets a more realistic perception/impression of the colors of the subsequent frames even if such color values fall outside the display gamut DP of the physical display device.

Figure 4:
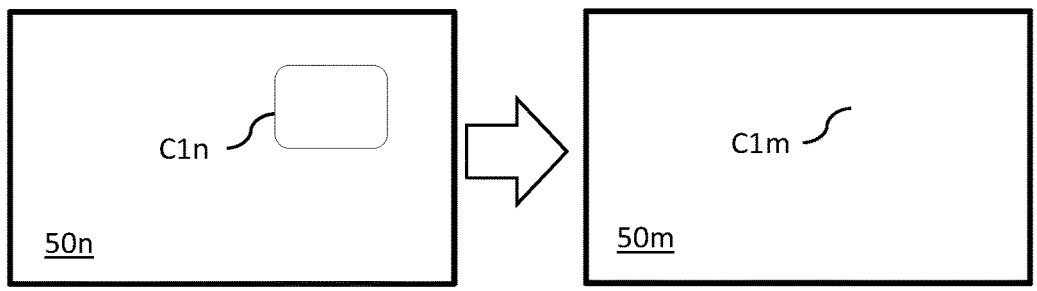
FIG. 4 illustrates color mapping of natural colors to display colors.

Turning briefly to FIG. 4, the rectangle 50*n* on the left hand represents a frame with color values for each pixel. The pixel area indicated by the black region has a color value C1*n* which falls outside the display gamut. When the display is presenting the frame, the color values of the pixels in the frame are actually mapped to the display gamut leading to a situation where in the displayed image 50*m* the original input color value C1*n* was mapped to a displayable color value C1*m* with a lower level of color saturation. That is, the color richness of the displayed image 50*m* is lower that the color richness in the original frame 50*n* of the image sequence.

Figure 5:
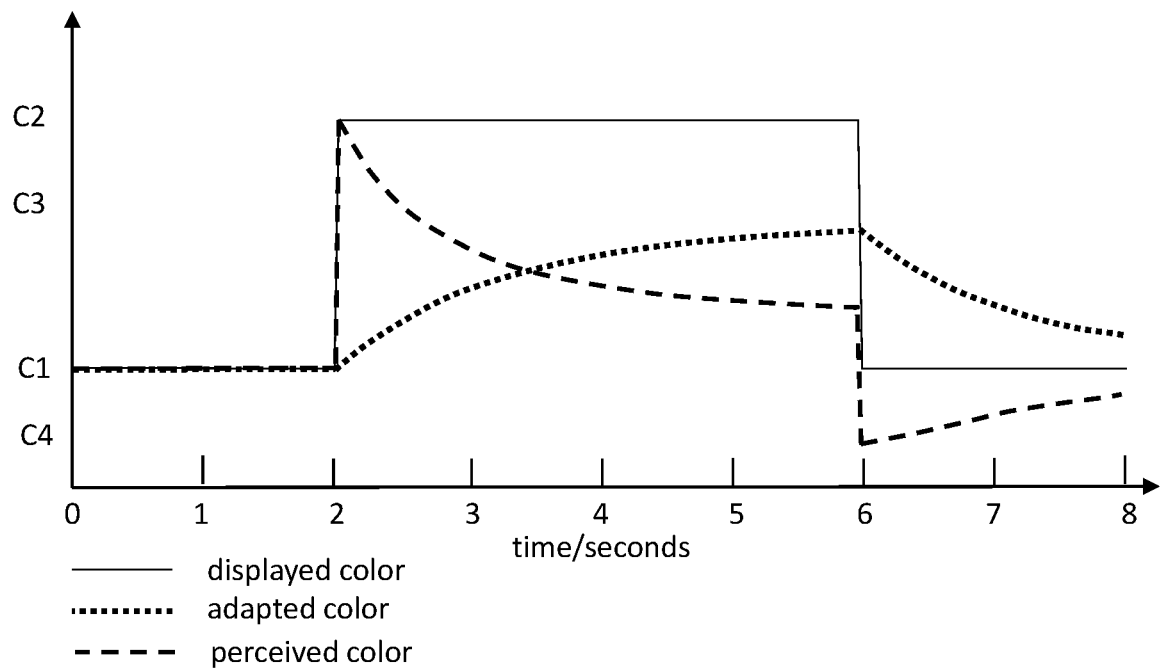
FIG. 5 illustrates chromatic adaption adaptation behavior of a human viewer.

Turning briefly to FIG. 5, this figure illustrates the time curve of chromatic adaptation showing an example for two sudden changes of displayed color stimuli with the corresponding adapted and perceived colors. In the example of FIG. 5, initially the viewer is adapted to a first color C1 (in this example: white). After two seconds the displayed color (solid line curve) suddenly changes to C2 and the viewer adapts to the new displayed color C2 over time. However, the adaptation (dotted line curve) does not reach the level of C2 but reaches the color C3 at t=6. This adaptation results in the displayed color C2 being perceived less saturated which is illustrated by the perceived color curve (dashed line curve). After 6 seconds, the original color C1 is displayed again. However, because of the chromatic adaptation, at 6 seconds, the viewer does not perceive C1 as the original color (e.g., white). Rather, the color is perceived as the complementary color of the currently adapted color C3. Adapted and perceived colors are plotted for the beginning of each frame.

Chromatic adaptation happens at several stages with different adaptation times in the human visual system HVS. The adaptation can be modelled by a sum of exponential functions. For example, a fast phase of adaptation and a slow phase may be represented as (numbers calculated from the averages over all participants):

fast adaptation: half-life $T_0 \approx 0.8$ s, $N_0 \approx 53\%$ slow adaptation: half-life $T_1 \approx 30$ s, $N_1 \approx 47\%$ Here, N denotes the fraction of influence the exponential has on the adaptation and T is the half-life, i.e. the influence of a color viewed T seconds ago is half of the initial influence. A near-instantaneous adaptation phase, finishing, e.g., in less than 25 ms, may be part of the fast phase referenced above. The herein disclosed computer system does not make use of instantaneous adaptation, as this roughly corresponds to the time a single frame is displayed, but focuses on exploiting the aforementioned slow and fast phases.

Using the sum of exponentials for the two phases one can calculate the adapted white point as follows. Starting from an initially adapted white point (e.g. the display white point $w_{disp}$ in LMS color space), a color stimulus c given in LMS color space for t seconds results in an adaptation towards c for a fraction $(1-f(t))$ (using $T_i$, where i=0 refers to fast adaptation, and i=1 refers to slow adaptation, respectively):

$$f(t) = \sum_{i=0}^{1} N_i e^{-\alpha_i t}, \alpha_i = \frac{\ln(2)}{T_i}$$

The adapted white point $w_{adapt}$ in LMS color space after t seconds is then $$w_{adapt} = f(t) \cdot w_{disp} + (1-f(t)) \cdot c$$

Turning back to FIGS. 1A and 2, the color data of the pixels of a particular frame of the received image sequence are denoted $c_{x,y}$ (=colors in the image at the pixel with the spatial coordinates x, y) in the following.

The computer system has a white point computation module 120 to compute 1200 for each particular frame of the received image sequence 21 a frame-specific target white point TWP based on the input color data of the respective frame. The computation is performed in the LMS color space. In case the originally received input color data is not in the LMS color space, an optional color space transformation module CST 170 may be used to transform the received input color data into the LMS color space for further processing. The frame-specific target white point TWP is the white point to which the viewer would adapt when watching the particular frame on a display capable of showing all perceivable colors. The target white point TWP can be denoted as:

$$\begin{pmatrix} L_1 \\ M_1 \\ S_1 \end{pmatrix} = \text{whitepoint}(c'_{x,y})$$

Figure 1B:
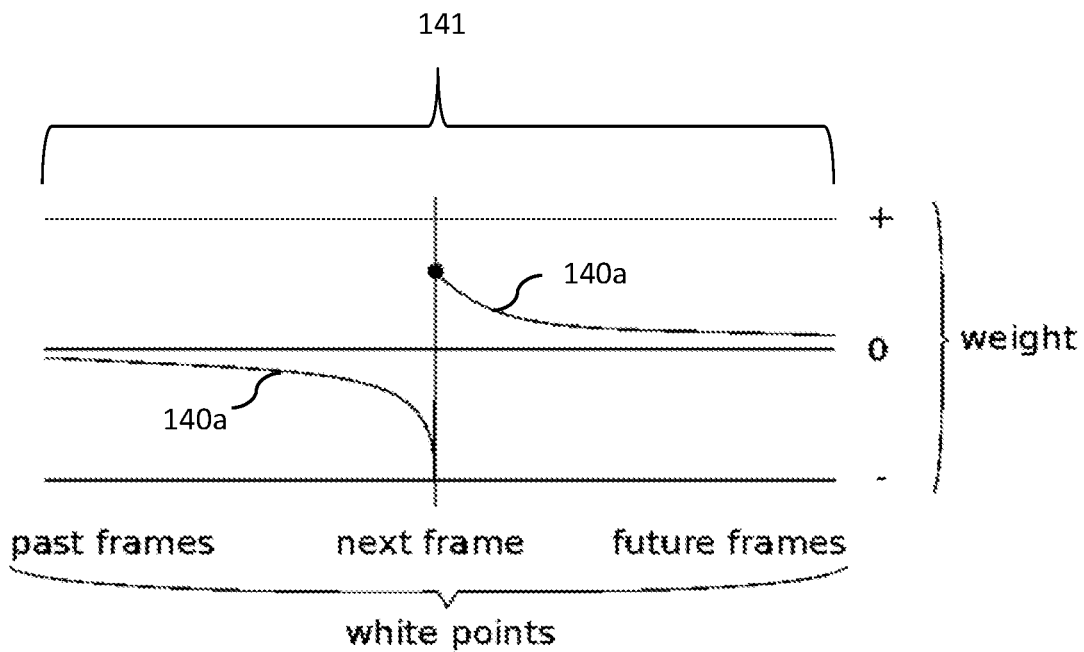

The computed TWPs are provided to a chromatic adaptation transformation module CAT 130 which selects 1300 a current frame in the frame sequence. Thereby, the current frame represents a current output to the display device. In case of an online application, such as computer game or a virtual reality application, the current frame corresponds indeed to the frame which is currently output on the display device. Online application in this context refers to an application which outputs frames to the user right after the creation of the frames by the application. In case of an offline application, such as the offline processing of a movie file for later streaming of the movie, the current frame is the frame that would be output to the display device at the time the user watches the movie. The CAT 130 iteratively performs the following operations:

A temporal filter function TFF 140 is applied to the target white points of all frames within a sliding window. Turning briefly to FIG. 1B, the sliding window 141 corresponds to the time range covered by TFF 140. The sliding window includes the current frame, a predefined number of past frames preceding the current frame, and a predefined number of future frames succeeding the current frame. The CAT 130 computes a filtered white point for the next frame following the current frame. The filtered white point is computed as weighted sum of all target white points associated with the frames in the sliding window 141. The temporal filter function defines a weight value 140*a* for each target white point of the sliding window in that the weight values applied for the past frames and the current frame have the same sign (in the example "−") and are set to counteract the adaption to the white points of the past and current frames. The weight values 140*a* applied for the future frames have the opposite sign (in the example "+") and are set to preventively adapt the viewer's perception of the display white point towards the white points of the future frames. The filtered white point can be denoted as:

$$\begin{pmatrix} L'_w \\ M'_w \\ S'_w \end{pmatrix} = \sum_{j=i-n}^{i+n} \text{weight}_j \cdot \text{whitepoint}(\text{frame}_j)$$

In the embodiment of FIG. 1B, the temporal filter function extends over the sliding window 141 (a predefined number of frames over the sequence of frames defining the range of the filter), and the weight values associated with white points of past and current frames, and the weight values associated with white points of future frames represent two monotonic functions with the same monotonic behavior. In the example, both branches of the temporal filter function are monotonically decreasing with the branch extending over the past frames up to the current frame having negative weight values, and branch extending over the future frames having positive values. The temporal filter function performs a step function from the current frame to the following future frame in the direction opposite to the monotonic behavior of the two monotonic functions. The term step function as used herein describes that the temporal filter function has a discontinuity between the current and the following future frame at which its value jumps in the direction opposite to the monotonic behavior of the two monotonic functions. Thereby, the weight value for the next frame (following the current frame) is indicated with a black bullet on the value curve 140*a*.

Figure 1C:
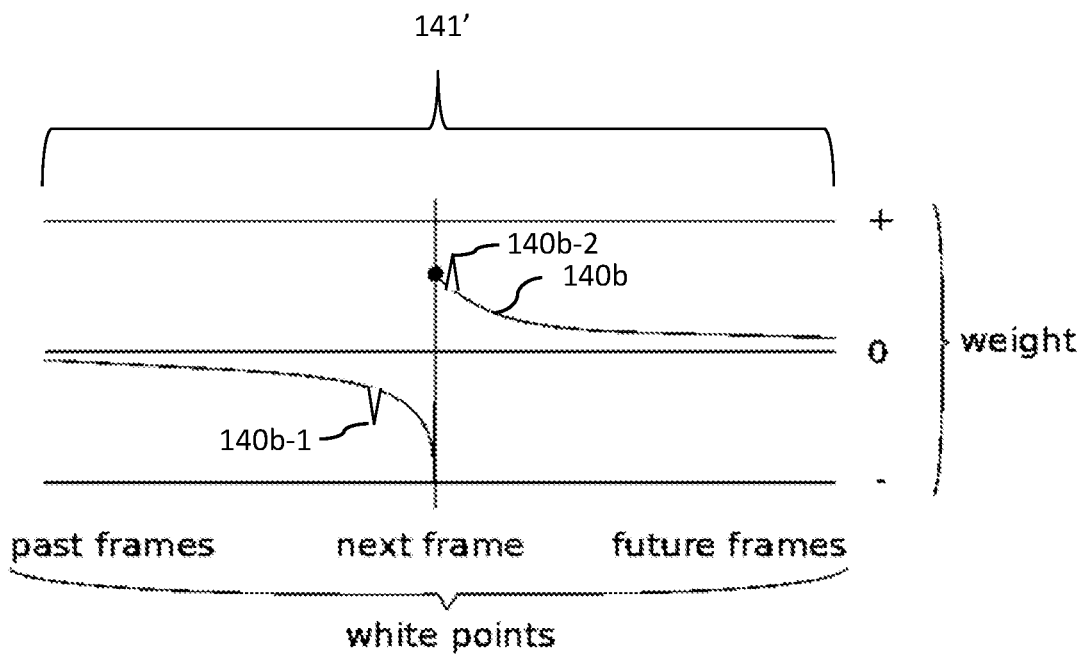

FIG. 1C illustrates an alternative embodiment of a temporal filter function 140*b* which includes exceptions to monotonic behavior in the sliding window 141'. In this embodiment, at least one weight value 140*b*-1, 140*b*-2 is putting a particular weight on the target white point of at least one corresponding frame in the sliding window. For example, the temporal filter function 140*b* may be based on the function 140*a* of FIG. 1B. However, the filter function may be dynamically configurable in that, for example, the frame sequence may include metadata associated with the frames which provides information for an exceptional weighting of particular frames. Once a frame with such weighting data is processed by the CAT module 130 (using TFF 140), the system can replace the default weight value in the default filter function with a special weight value derived from the respective metadata information. While the sliding window is moving over the frames during the loop processing, the scaling of the weight value based on the received metadata may change. For example, the weight value 140*b*-1 may be scaled to gain higher influence when still being close to the current frame but may be scaled down to exert lower influence when the sliding window is shifted in the direction of the future frames. The possibility of using metadata of frames for dynamically adjusting the weight values of the temporal filter curve allows to take into account the color perception of observers of the frame sequence already prior to watching the frame sequence (e.g., during creation of the frame sequence). Particular frames can be over-weighted or under-weighted to allow for an intended color perception which deviates from what is provided by the default TFF. For example, the metadata of a particular frame may provide directly a weight value associated with the respective frame which then overwrites the corresponding weight value of the temporal filter. In another example, the metadata may provide a factor (e.g., a multiplication factor) associated with the respective frame which is then applied to the corresponding weight value of the temporal filter to compute a corresponding modified weight value in accordance with the factor derived from the metadata.

CAT 130 then applies 1500 (cf. FIG. 2) a chromatic adaptation transformation to one or more future frames by using the filtered white point and selects 1800 the frame following next to the one or more transformed frames as the current frame. The one or more transformed frames are then provided to the output module 160. The output module may directly provide the transformed frames one by one as outgoing frame sequence 21' in the color space of the physical display. Alternatively, the output module 160 may buffer the transformed frames for later replay. In case a color space transformation is needed, the color space transformation module CST 170 (cf. FIG. 1A) may be used to perform such transformation. It is to be noted that the functions of the output module can also be integrated in the CAT module 130.

The loop is then repeated as long as the frame sequence includes still more unprocessed frames 1710. Once all frames of the received image sequence have been processed (or in case an exit condition is met—for example, a stop signal is launched by a user), CAT 130 finally exits 1900 the processing loop. The chromatic adaptation transformation transforms a color c y with respect to one white point WP1 to a second color $c_{x,y}$ with respect to a second white point WP2 and can be written in the form of a matrix operation:

$$c_{x,y} = \begin{pmatrix} \frac{L_{WP2}}{L_{WP1}} & 0 & 0 \\ 0 & \frac{M_{WP2}}{M_{WP1}} & 0 \\ 0 & 0 & \frac{S_{WP2}}{S_{WP1}} \end{pmatrix} c'_{x,y}.$$

Thereby, WP1 is the frame-specific target white point of the herein disclosed method, and WP2 is the filtered white point obtained with the temporal filter function. It is to be noted that $c_{x,y}$ is a color defined in the LMS color space. The transformation into the RGB color space can be performed by using CST 170 (cf. FIG. 1A).

Figure 7A:
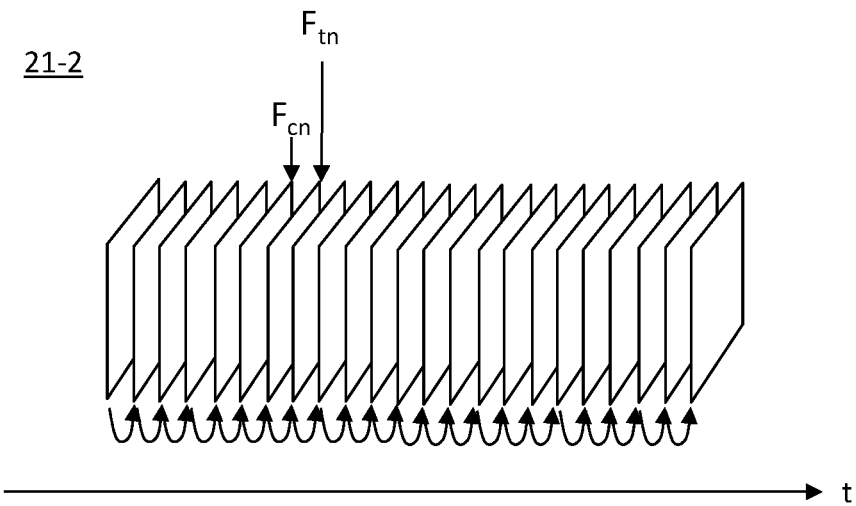
FIGS. 7A, 7B illustrate two examples for shift intervals of the sliding window.

The loop may use increments of different sizes when selecting 1800 the new current frame. Turning briefly to FIG. 7A, a scenario is illustrated where the loop always selects the frame following the next frame after having finished the processing of the next frame. The moment the next frame is provided 1700 as output for the display device (via output module 160), this frame becomes the current frame $F_{cn}$ (as the definition of the current frame is the frame which is currently output to the display device). In this scenario, the next frame $F_{tn}$ is processed in the following loop iteration performed by CAT 130. This embodiment performs best in terms of smooth color adaptation for the observers of the image sequence. However, it is also computationally more expensive because each frame of the entire frame sequence is processed with the temporal filter TFF 140.

Figure 7B:
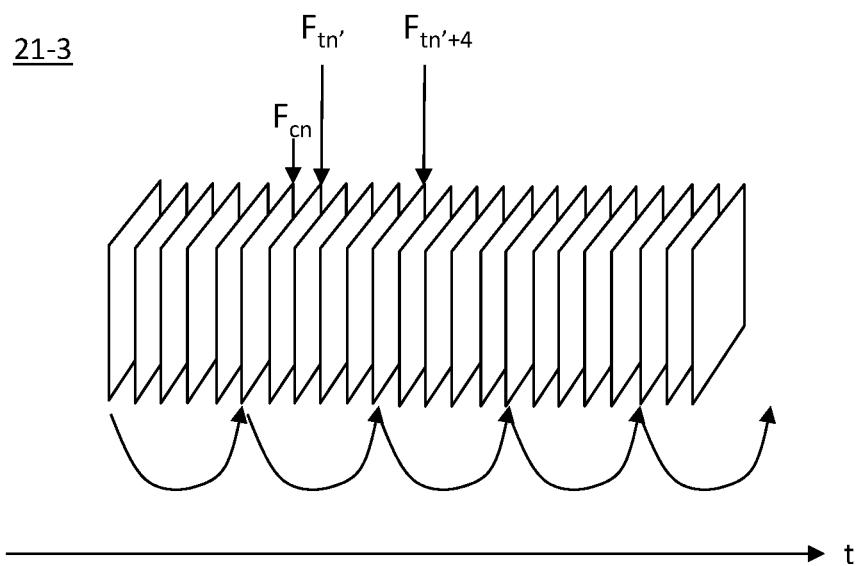

FIG. 7B illustrates an alternative embodiment where the loop increment is more than 1 frame. In the example, the loop increment is 5 (frames). That is, once the CAT has determined the filtered white point for frame $F_{tn'}$ (while $F_{cn}$ is the current output), the chromatic adaptation is not just applied to the next frame but also to the 4 frames following $F_{tn'}$ (up to $F_{tn'+4}$). This reduces the computational effort at the cost of a less smooth color transition. In this example, $F_{tn'+4}$ is selected 1800 as the new current frame.

In the examples in FIGS. 7A, 7B, the assumption is made that in all cases the number of past and future frames covered by the temporal filter range are known so that the corresponding white points can be computed and the temporal filter TFF 140 can be applied to the time (frame) interval as defined by the sliding interval. However, in dynamic applications, a situation may occur where only the frames in the past are known and future frames are dynamically generated by a software application (e.g., computer game or virtual reality application). To deal with such situations, the CAT 130 may further include a white point prediction module WPP 150.

Figure 6:
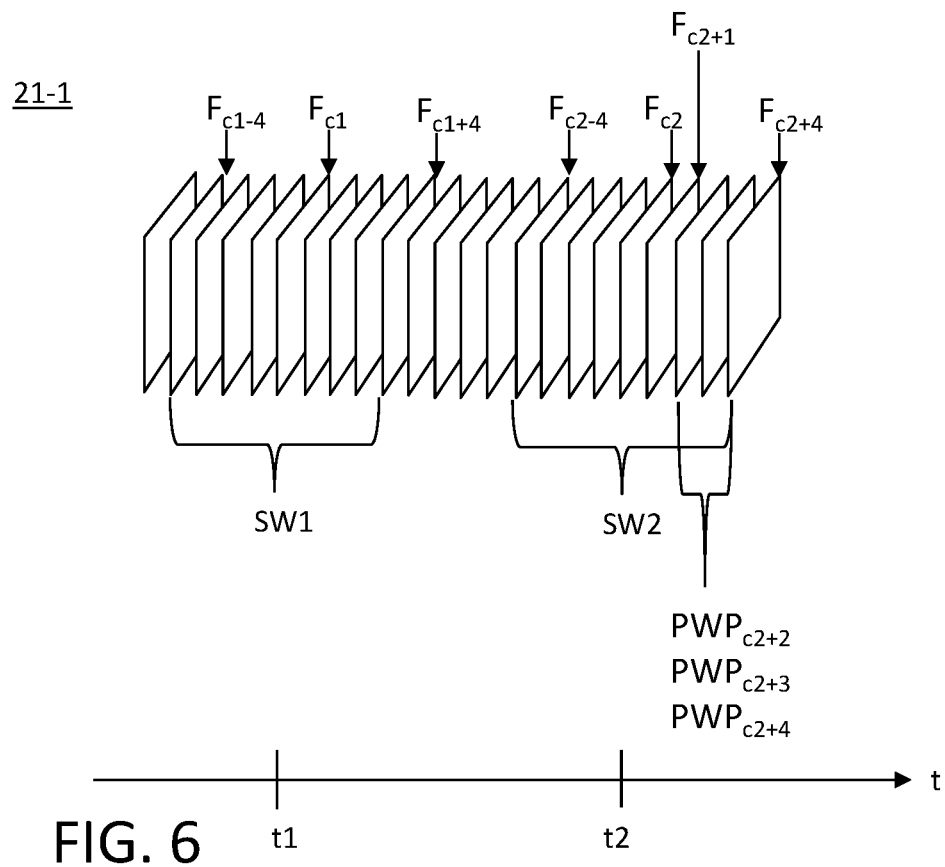
FIG. 6 illustrates an example of future frame white point prediction according to an embodiment.

FIG. 6 illustrates the functioning of the WPP 150 by way of example with a frame sequence 21-1. At time t1, a first sliding window SW1 extends around the first current frame $F_{c1}$ (from $F_{c1-4}$ to $Fc_{1+4}$). All frames in the first sliding window SW1 are already present—and therefore the respective white points are known—when the temporal filter function is applied. At time t2, the sliding window has shifted to the second sliding window SW2 around the second current frame $F_{c2}$. However, the frame sequence at t2 ends with $F_{c2+1}$. To apply the weights of the temporal filter for SW2, the filter also requires white points for the not yet received frames $F_{c2+2}$ to $F_{c2+4}$. Therefore, WPP 150 predicts the corresponding white points $PWP_{c2+2}$, $PWP_{c2+3}$, $PWP_{c2+4}$.

In general, in case that the number of future frames succeeding the current frame in the received sequence of frames 21-1 is less than the predefined number of future frames, WPP 150 uses a white point prediction method to predict 1400 frame specific target white points $PWP_{c2+2}$, $PWP_{c2+3}$, $PWP_{c2+4}$ for not yet received future frames $F_{c2+2}$, $F_{c2+3}$, $F_{c2+4}$ up to at least the predefined number of future frames. The predefined number of future frames corresponds to the number of future frames as defined by the size of the range of the temporal filter function (i.e. the size of the sliding window). Examples for white point prediction methods include but are not limited to: image space reprojection optical flow, and white point extrapolation.

As already discussed earlier, the white point prediction can use two alternative approaches. In one implementation, the entire future frames are extrapolated and a future white point is then computed based on the pixel information of the entire corresponding predicted future frame. In an alternative implementation, the white points are directly extrapolated based on the white points of preceding frames. The alternative implementation is advantageous in applications with real-time requirements, such as for example computer games or virtual reality applications. In such scenarios, the extrapolation of entire frames in real time is challenging and computationally very expensive. In contrast, the proposed extrapolation of the white points is far more efficient and for the purpose of the temporal filter application nothing more than the predicted white points is needed. White point extrapolation can be implemented by a person skilled in the art by, for example, by using a linear function for extrapolation, or by interpolation of a spline function through the preceding white points to approximate the future white points. In one embodiment, a neural network may be trained to learn the shifting behavior of white points in frame sequences to predict the future white points.

Information about future white points may also be made available as metadata in preceding frames. For example, a developer of a computer game, who knows the various options of how the game can continue, may already know that a current scene will change from a dark cave scenery to a bright sunny landscape scenery within the next 5 seconds. Therefore, the current frame may be annotated with metadata providing the future white point. The temporal filter can then complement the missing white point data by extracting the information from the metadata of the preceding frames and apply the temporal filter accordingly. This allows the user—while still operating in the cave scenery—to slowly adapt in a way that the colors of the sunny landscape will be perceived more intensive once the scenery changes.

FIGS. 8A, 8B and 9A, 9B show examples of white point adaption when using a temporal filter function which is directly based on the progress (development) of adaptation.

Figure 8A:
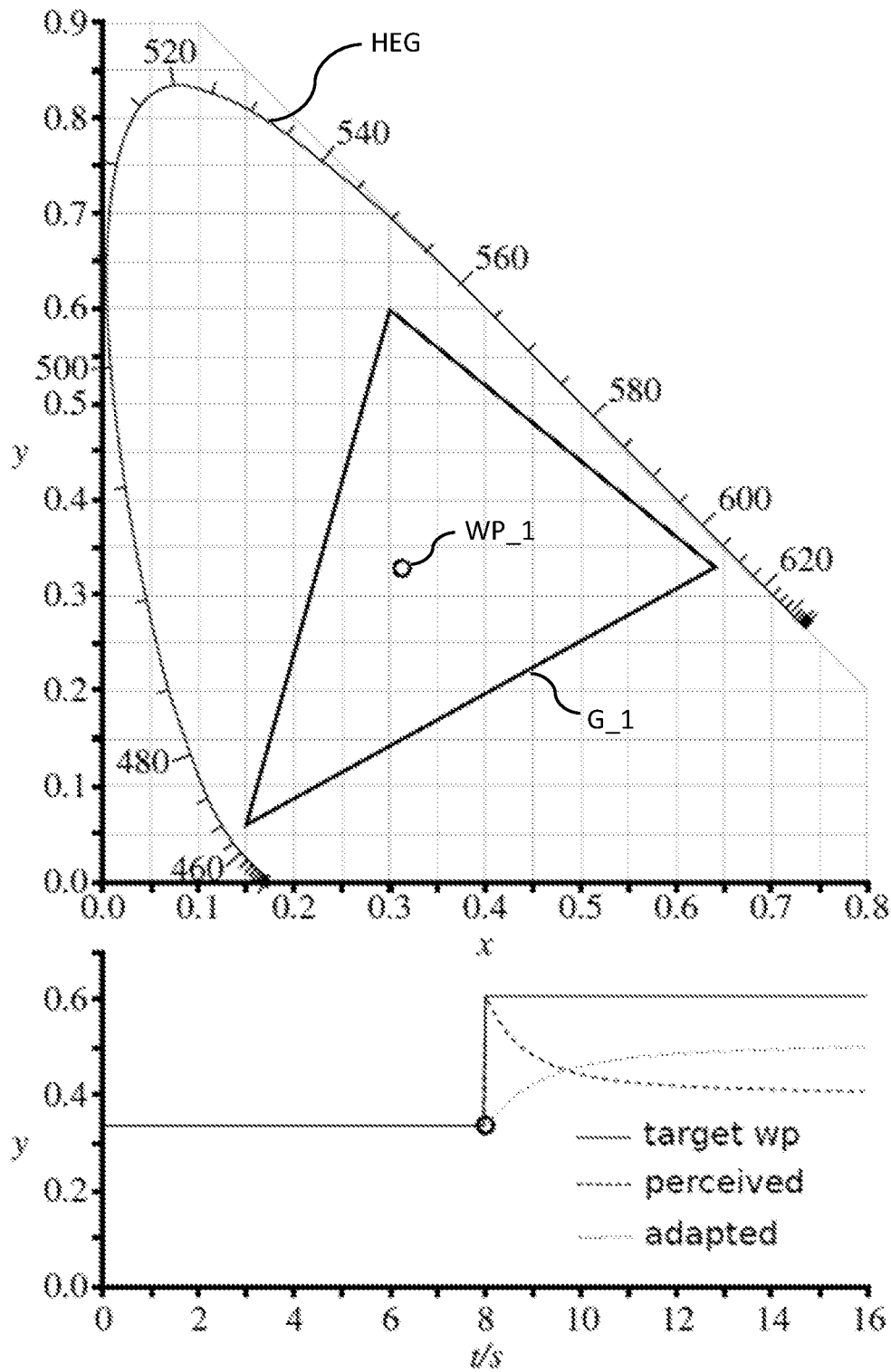
FIGS. 8A, 8B, 9A, 9B, 10A, 10B, 11A, 11B and 11C show examples of white point adaption when using a temporal filter function.

The lower part of FIG. 8A illustrates how a target white point (solid line) in a sequence of frames (shown during the time interval of 16 s) changes ad hoc (between two frames) after 8 s from white (the display white point WP_1) to a saturated green without any white point adjustment (no temporal filter application). The dashed line illustrates how a user perceives the saturated green color and the dotted line illustrates the user's adaption to the saturated green color over time. With each frame the user adapts to the target white point of the displayed frame. At the circle at 8 s (before the color switch) the user is fully adapted to the white color of the display white point. The color to which the user has adapted at the respective frame is represented by the dotted line. During the first 8 seconds, a frame with the display white point is displayed. Right after the color switch, the user starts to adapt to the new green color (y=0.6) over the next 8 seconds. As a consequence of the adaptation the green color perception (dashed line) becomes less intensive over time. That is, dependent on the degree of adaptation, the actually displayed target white point (solid line) is perceived with decreasing color saturation over time (dashed line) by the user.

The upper part of FIG. 8A illustrates a chromaticity diagram showing the target white point WP_1 (display white point) at t=8 s. During the first 8 seconds, the target white point is associated with the display gamut triangle G_1. The scale attached to the human eye gamut HEG reflects the wavelengths of the respective colors in the HEG. The skilled person is familiar with such gamut representations. At t=8 s, it is assumed that the user was exposed to the target white point WP_1 long enough so that he is fully adapted to the display white point and perceives the display white point as white color. Therefore, the display white point, the adapted white point and the perceived color all are at the same place in the chromaticity diagram "original white points".

Figure 8B:
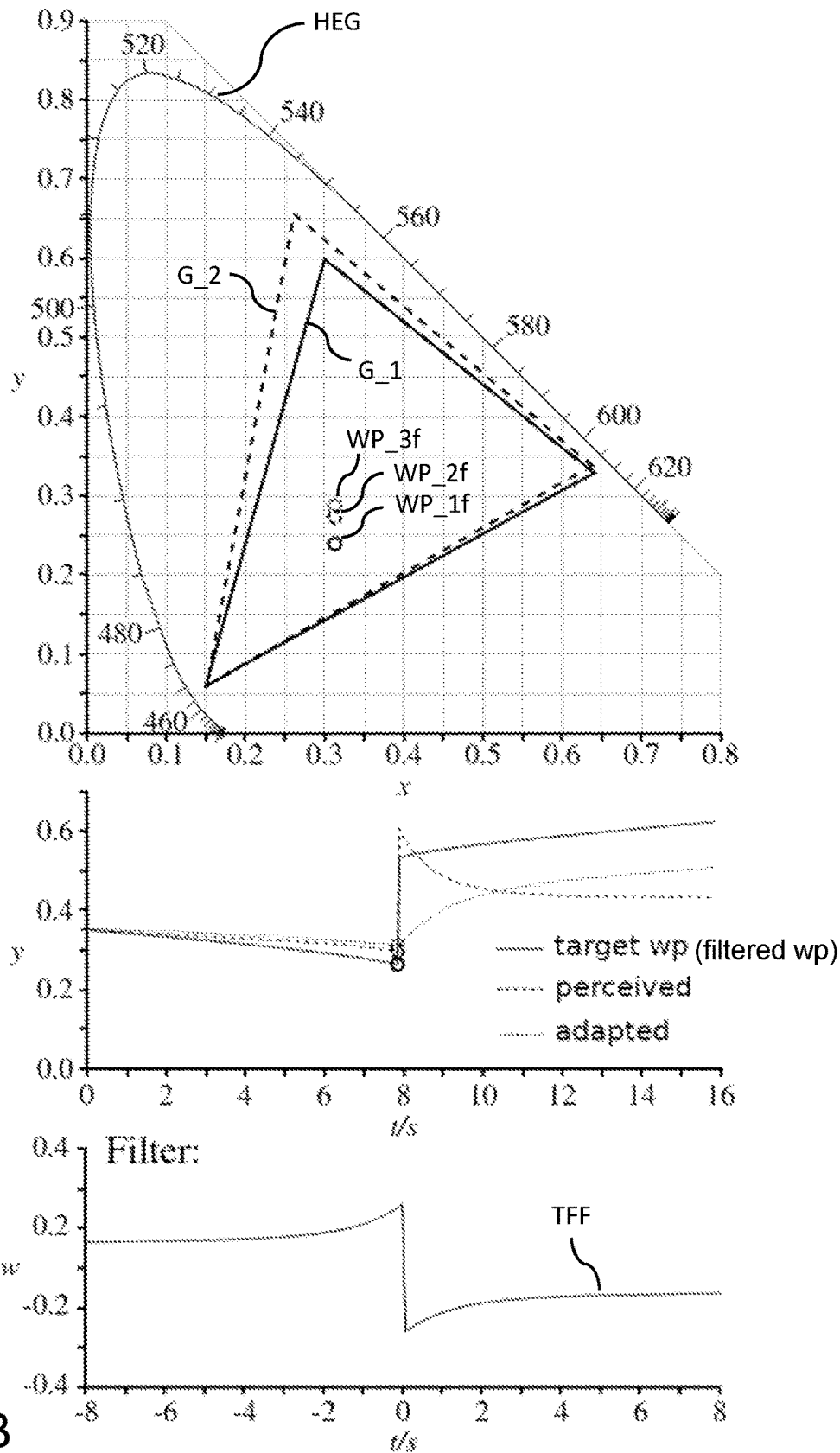

Turning now to FIG. 8B, a temporal filter function TFF (lower part of FIG. 8B) is used with a sliding window that ranges from −8 s to +8 s, and with a discontinuity at 0 s to compute filtered white points (solid line in the graph in the middle of FIG. 8B). In this example, the weight values of the TFF filter function have opposite signs compared with the examples in FIGS. 1B, 1C. As explained earlier, the signs of the weights can be chosen dependent on the chromatic adaptation transformation which is used. The weights w in the temporal filter function are defined in accordance with the above described function:

$$f(t) = \sum_{i=0}^{1} N_i e^{-\alpha_i t}, \alpha_i = \frac{\ln(2)}{T_i}.$$

TFF is applied to the target white points (solid line in FIG. 8A). That is, the target white points of FIG. 8A are filtered with the TFF in that for each frame the weighted sum of past white points (frames up to 8 s into the past) and future white points (frames up to 8 s into the future) is computed as the filtered white point. Thereby, in this example it is assumed, that the white color was already shown for at least 16 s before the color switch (at t=8 s) and the green color is shown for at least 16 s after the switch so that the TFF is always applied to the respective white points over the entire range of the sliding window. With each frame, the user adapts more into the direction of the filtered white point of the respective frame (dotted line) and perceives the displayed colors in a different way as illustrated by the dashed line. The weighting factors of the TFF in this embodiment are in the range between −0.3 and +0.3. The filtered white point is used for the chromatic adaptation transformation to compute the pixel colors of the next frame for output to the display device.

The result is shown as the filtered white point curve (solid line) in the middle graph of FIG. 8B. The filtered target white points before the color switch are increasingly shifted to lower values up to 8 s whereas the filtered target white points after the color switch start at a lower value but are then increasingly shifted to higher values up to 16 s. In other words, the application of TFF to the original target white points of the frame sequence makes the user to adapt to a white point at t=8 s which has a lower y-value than the adapted white point in FIG. 8A because the adapted white point (dotted line) follows the filtered (displayed) white point. Also, the perceived color (dashed line) shows the same trend, thus leading to a perceived color value (dashed circle) at t=8 s which is lower than without the temporal filter application. That is, the temporal filter application introduces an error in favor of a more suitable adaptation with regards to future frames. The y-coordinates in the filtered white point graph correspond to the y-coordinates in the chromaticity diagram in the upper part of FIG. 8B. The edges of the original display gamut G_1 are transformed (at t=8 s) with the filtered white point at this point in time. This transformation leads the transformed gamut G_2 which contains more greenish colors than the original display gamut. In other words, the perceived gamut G_2 was enhanced by the respective chromatic adaptation transformation based on the filtered white point.

When comparing the filtered white point WP_1$f$ with the target white point WP_1 in FIG. 8A, the filtered white point has moved to a substantially lower y-value (i.e. a more reddish color). Also the adapted white point WP_3$f$ and the perceived white point WP_2$f$ have lower y-values compared to FIG. 8A (reddish appearance). The user now perceives a color with more reddish appearance (the adapted white point WP_3$f$) as white. The filtered white point after the color switch (which corresponds to the actual display output) is also shifted towards the red direction through the temporal filter application. However, because of the red bias of the user at the moment of the color switch, the green output color which is now shifted to the red (compared with the no-filter solution in FIG. 8A) is perceived by the user as almost the same color as in the no-filter solution.

Figure 9A:
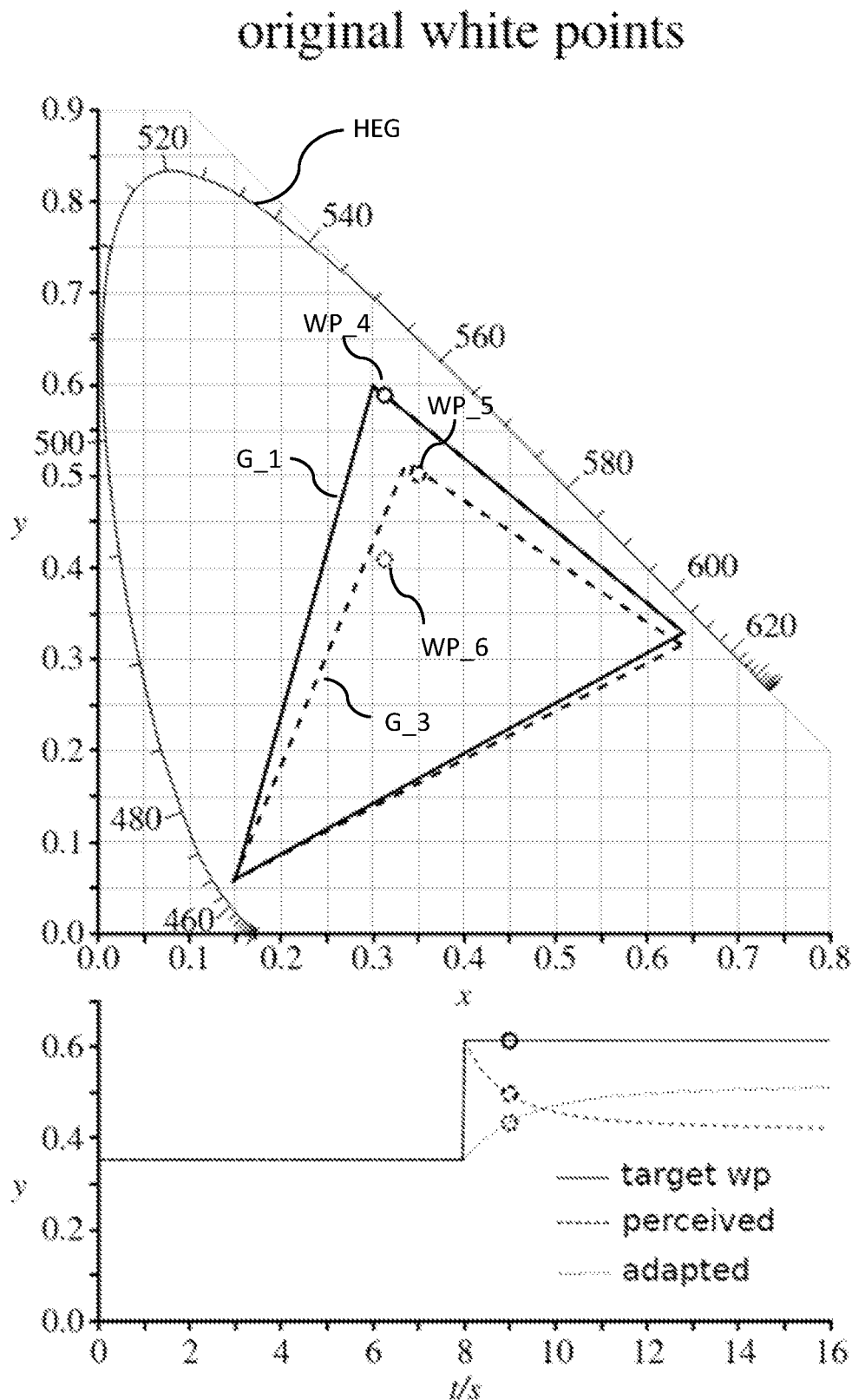

In FIG. 9A, the no-filter solution is analyzed at t=9 s. The target white point WP_4 corresponds to a greenish color which is at the border of the display gamut G_1. Because, in the meantime since the color change at t=8 s, the user has adapted to the adapted white point WP_6 (dotted line), the perceived color WP_5 has moved. In the chromaticity diagram "original white points" (upper part of FIG. 9A), the perceived gamut G_3 at t=9 s differs from the original display gamut G_1 because of the chromatic adaptation of the user. Especially blue and green colors are perceived less saturated compared to a viewer adapted to the display white point.

Figure 9B:
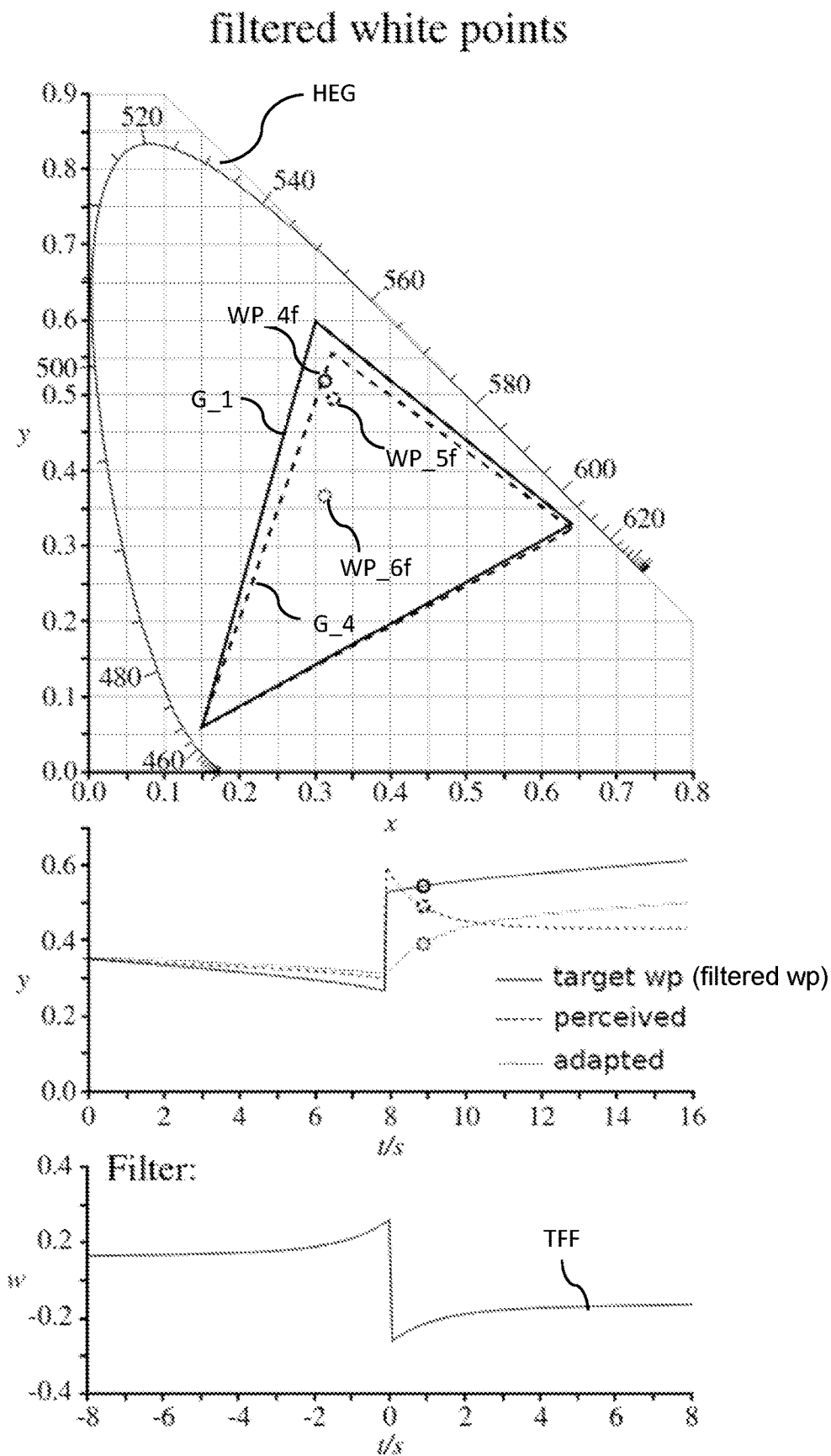

FIG. 9B illustrates the temporal filter TFF solution at T=9 s. As can be seen in the chromaticity diagram "filtered white points", the filtered target white point WP_4$f$ (solid circle), the perceived target white point WP_5$f$ (dashed circle) and the adapted white point WP_6$f$ (dotted circle) are all shifted towards reddish colors. While the perceived color WP_5$f$ is similar to the perceived color WP_5 of the no-filter solution, the perceived gamut G_4 contains more saturated blue and green colors which could be displayed compared to the gamut G_3 of the no-filter solution.

The following figures demonstrate the effect of the temporal filter for a scenario with a color change which switches from white to a green color that is shifted to a more saturated green (y=0.65) than in previous figures. The considered frames in the following discussion are closer to the switching time point (t=8 s). The frame considered in FIGS. 10A, 10B is at t=7.9 s and the frame considered in FIGS. 11A, 11B is at t=8.1 s.

Figure 10A:
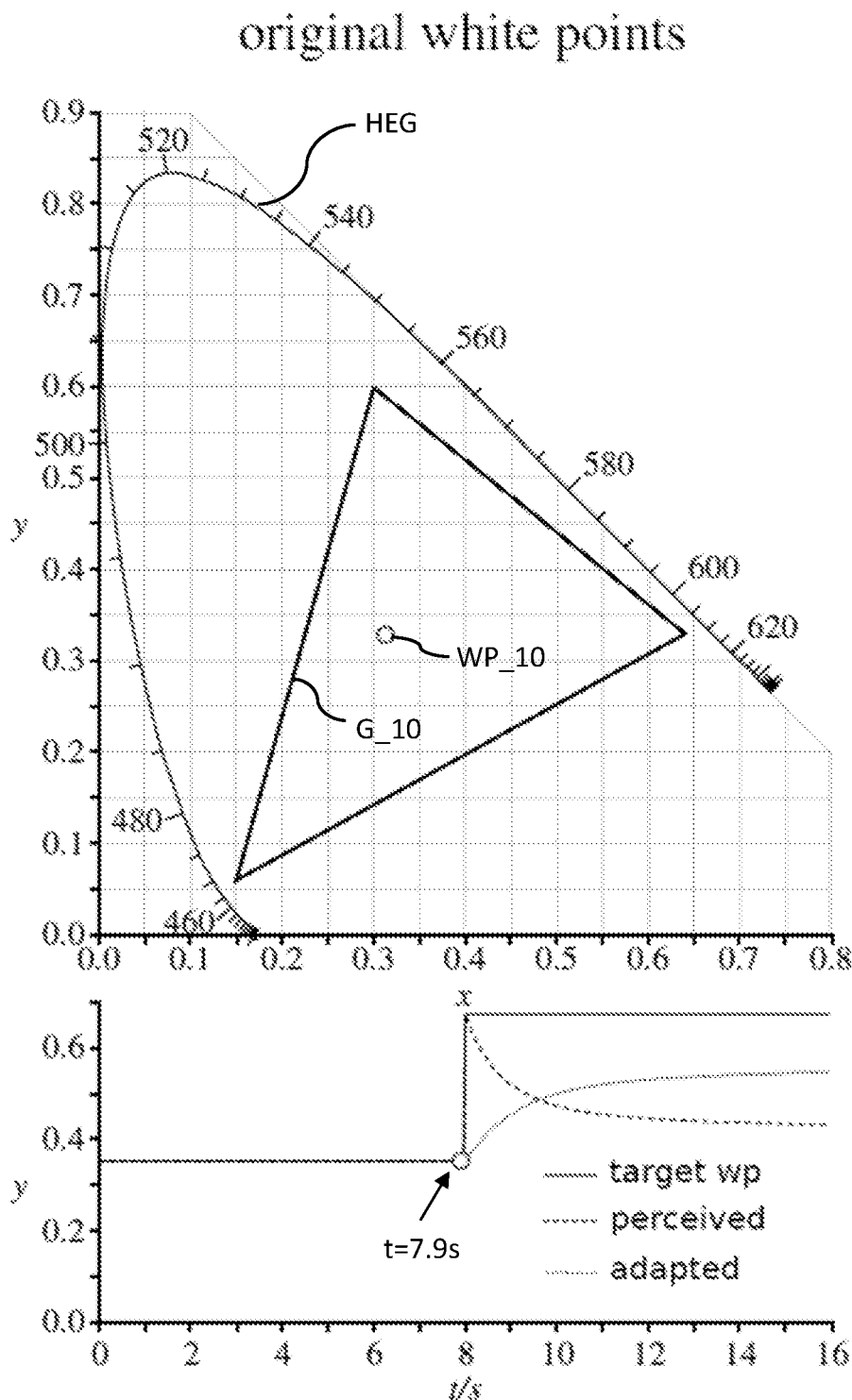

Similar to FIG. 8A, FIG. 10A illustrates the no-filter situation just before the color switch at t=7.9 s where the user has adapted to the target white point WP_10 of the display gamut G_10.

Figure 10B:
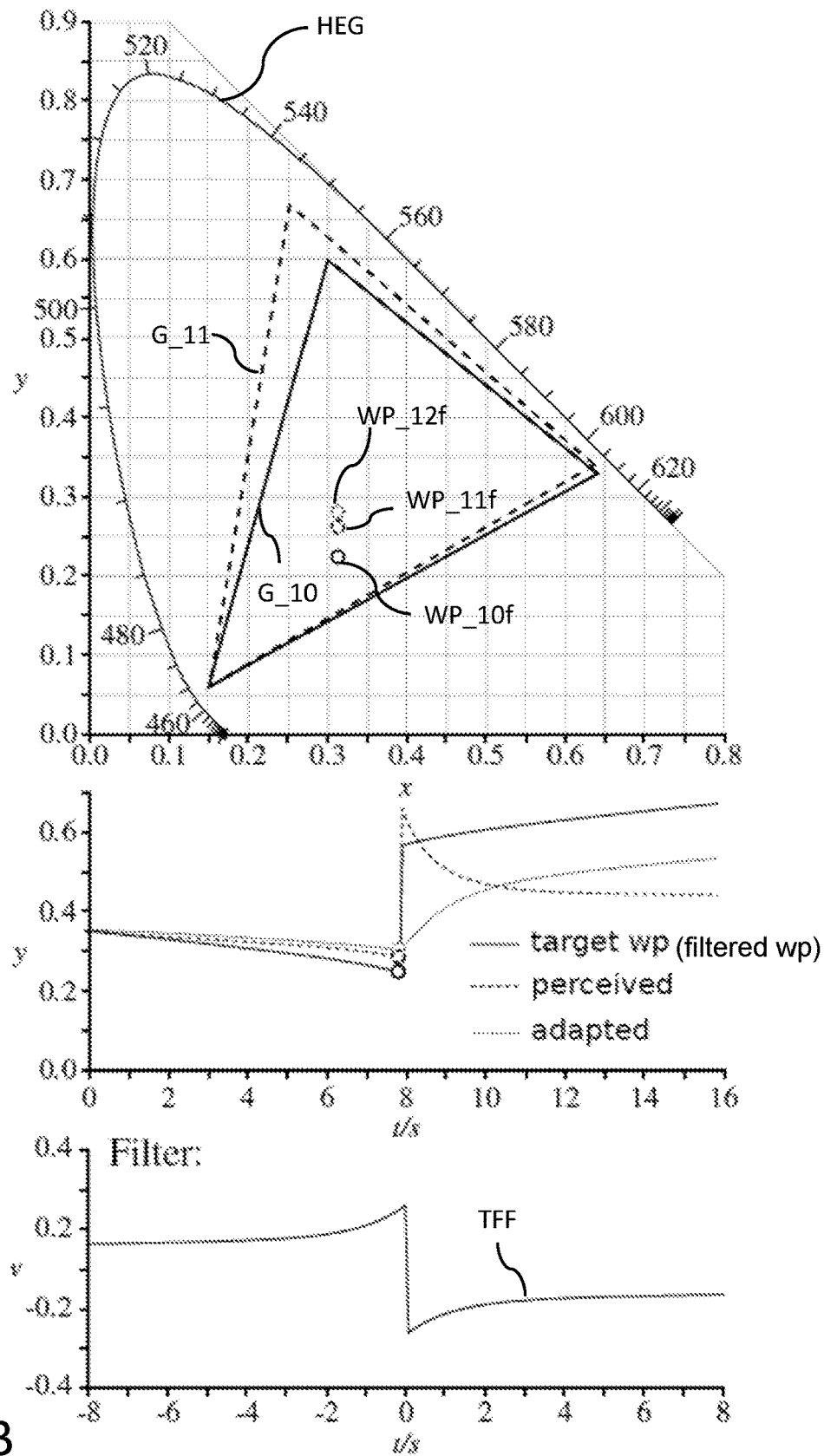

FIG. 10B illustrates the situation at t=7.9 s when applying the TFF. Similar to the scenario in FIG. 8B, the filtered target white point WP_10$f$, and the resulting adapted white point WP_12$f$ as well as the resulting perceived white point WP_11$f$ are shifted towards the red colors. The perceived gamut G_11 contains more greenish colors than the display gamut G_10.

Figure 11A:
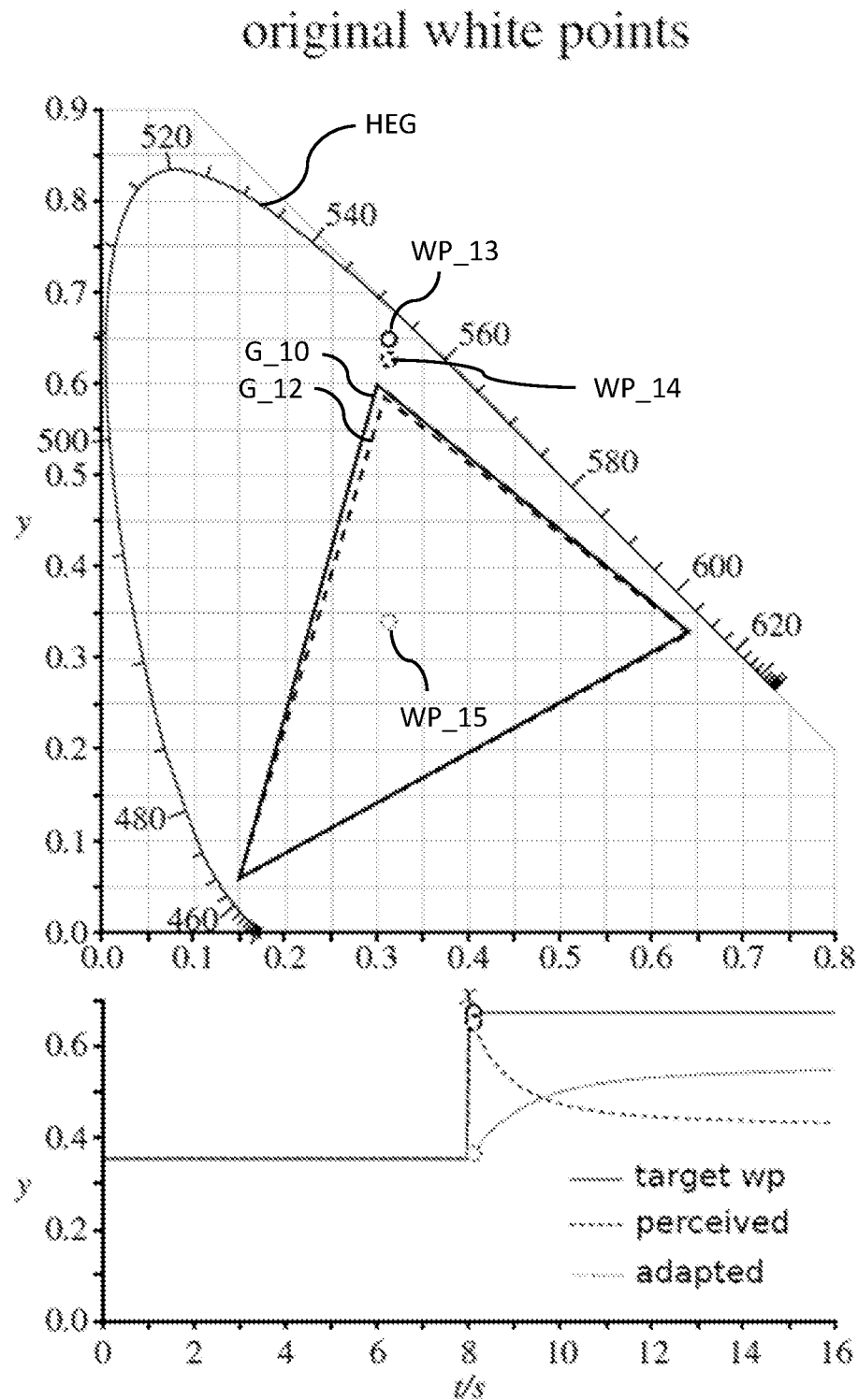
Figure 11B:
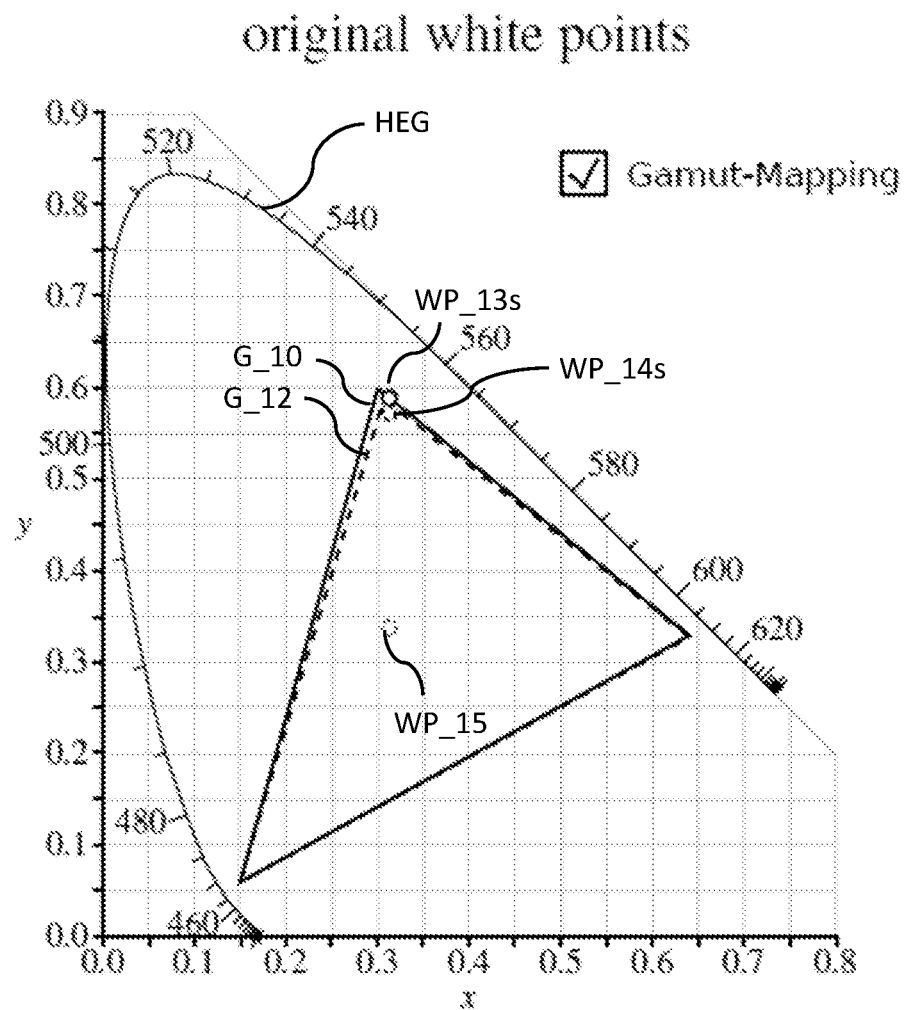

FIG. 11A illustrates the no-filter situation at t=8.1 s, i.e. shortly after the color switch, on an ideal, imaginary display which is capable of displaying all colors perceivable by a human observer. The target white point at that time is WP_13. The adapted white point WP_15 is still very close to the target white point before the color switch because, at this time, the user is hardly adapted to the new target white point WP_13. In order to demonstrate the effect of adaptation, FIG. 11A also shows the device gamut G_10 of a physically realizable display and the perceived gamut G_12 resulting from the adapted white point WP_15. These two gamuts are depicted only for comparison and have no influence on the displayed colors in this example. Note that WP_13 is clearly outside the display gamut G_10 and thus cannot be reproduced by that display. For such cases, traditional systems use gamut mapping which is well known in the art and therefore only shortly explained in FIG. 11B.

In FIG. 11B, the target white point at t=8.1 s is shifted to the edge of the display gamut G_10 (shifted target white point WP_13$s$) and can now be reproduced by the display. This has the effect that also the perceived target white point is shifted to the edge of the perceived gamut G_12 (shifted perceived white point WP_14$s$). However, the color is less saturated than it should be in accordance with the situation in FIG. 11A. Additionally, there may exist even more saturated colors in the original frame that need to be mapped into the display gamut. Therefore, the color experience of the user is negatively affected by the gamut mapping approach.

Figure 11C:
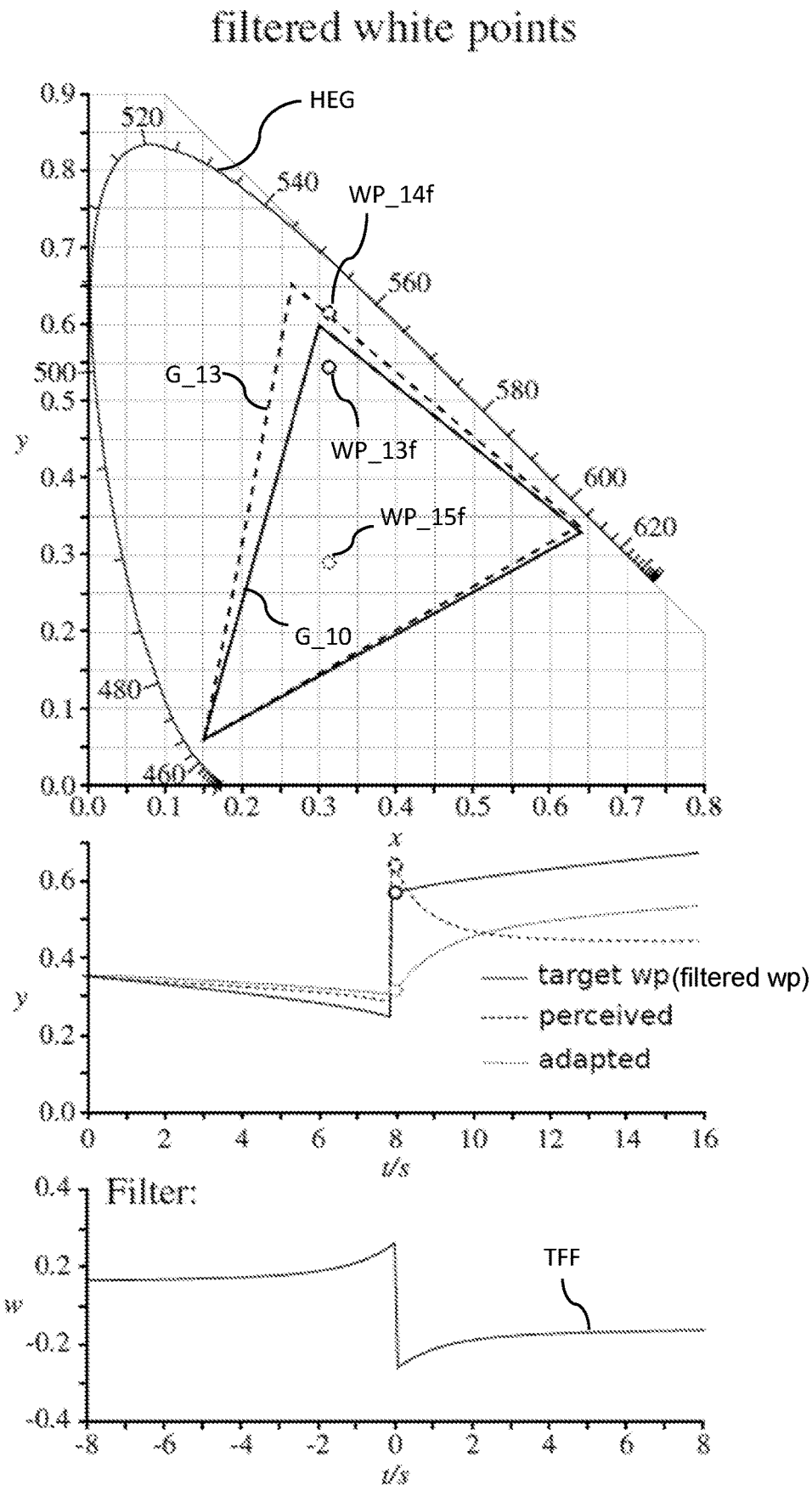

FIG. 11C illustrates, how the herein disclosed temporal filter approach provides a solution to this prior art problem. Again, the TFF is applied to the target white points shown in the middle graph of FIG. 11C resulting in the filtered target white points as shown in the middle graph of FIG. 11C. As a consequence of the TFF application, the adapted white point WP_15$f$ at t=8.1 s has moved towards the filtered target white point before t=8 s when compared with the no-filter scenario. Further, because of the color shift applied to the target white points before the color switch, the perceived white point WP_14$f$ is even above the filtered target white point WP_13$f$ thus representing a more saturated green color. The big difference in comparison with the no-filter scenario is that, with the TFF application computing the filtered target white point WP_13$f$, and the following chromatic adaptation transformation of the entire frame based on the filtered white point, the perceived gamut G_13 is extended in such a way that the perceived white point WP_14$f$ is right at the edge of the perceived gamut, and therefore perceptible by the user. WP_14$f$ in FIG. 11C is also closer to WP_14 in FIG. 11A. That is, the user has a more natural color experience which nicely reflects the distance between colors before and after the color switch although the display device with its device gamut G_10 is not able to display the corresponding target color after the color switch. By using the chromatic adaptation behavior of the human visual system, the corresponding temporal filter function allows to create a realistic color experience for the user even though the display capabilities of the device would not allow for this with the commonly used gamut mapping techniques.

Figure 12:
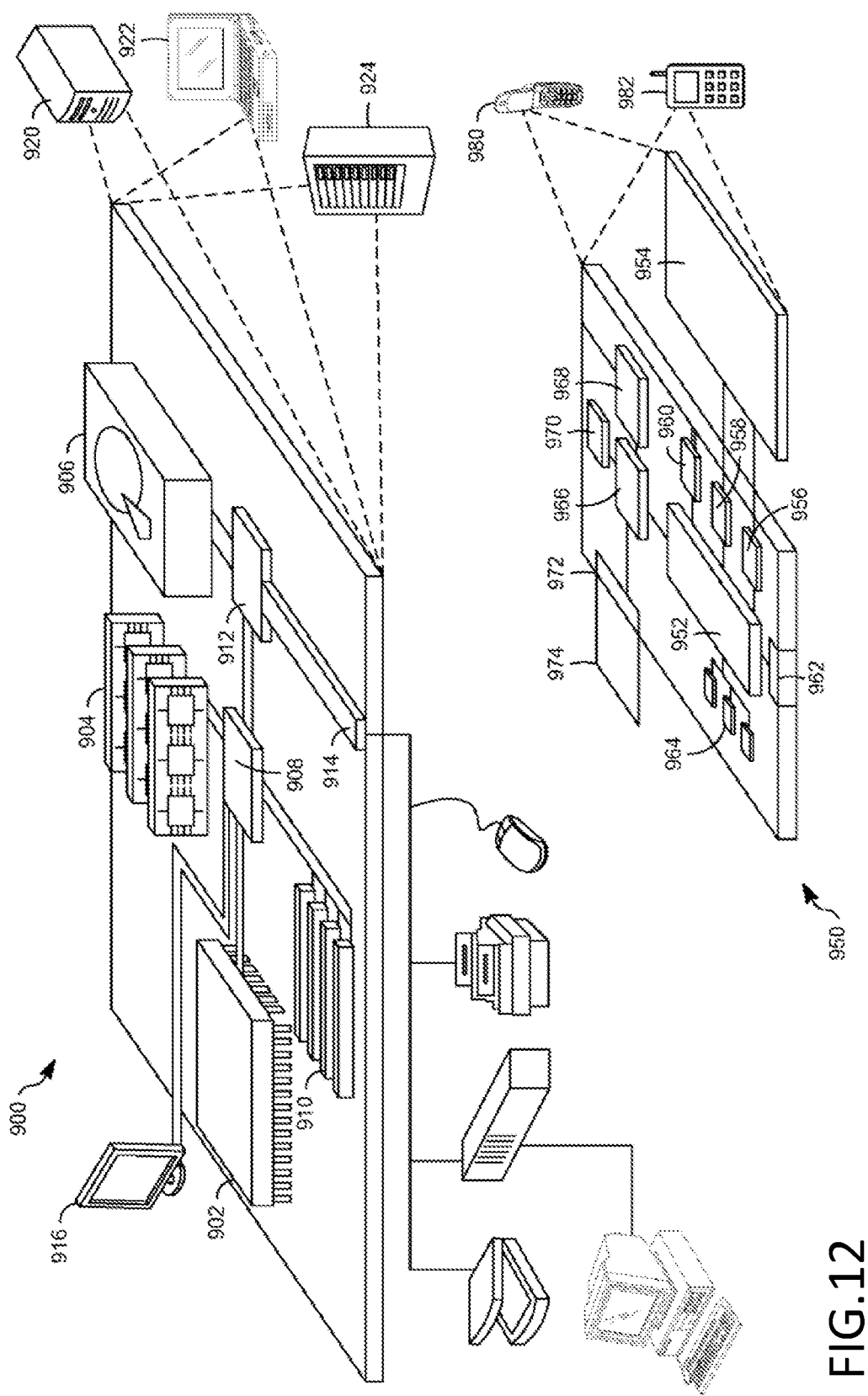
FIG. 12 is a diagram that shows an example of a generic computer device and a generic mobile computer device which may be used with the techniques described herein.

FIG. 12 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to watch the transformed frame sequences. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for enhancing the perceived gamut (PG) of a physical display device presenting frames of an image sequence to a human viewer wherein the display gamut (DG) of the display device is given by the primary colors of the display device, the method comprising:

receiving a sequence of frames with each frame having input color data associated with each pixel of the respective frame, the input color data being given in a specified color space;

computing for each frame of the received sequence, in the LMS color space, based on the input color data of the respective frame, a frame-specific target white point, wherein the frame-specific target white point is the white point to which the viewer would adapt when watching the particular frame on a display capable of showing all perceivable colors;

selecting a current frame (Fc) in the frame sequence wherein the current frame represents a current output to the display device;

a) applying a temporal filter function to the target white points of all frames within a sliding window (SW1), the sliding window comprising the current frame (Fcn), a predefined number of past frames preceding the current frame, and a predefined number of future frames succeeding the current frame, to compute, for the frame following the current frame, a filtered white point as weighted sum of all target white points associated with the frames in the sliding window, wherein the temporal filter function defines a weight value for each target white point of the sliding window in that the weight values applied for the past frames and the current frame have the same sign and are set to counteract the adaption to the white points of the past and current frames, and the weight values applied for the future frames have the opposite sign and are set to preventively adapt the viewer's perception of the display white point towards the white points of the future frames;

b) applying a chromatic adaptation transformation to one or more future frames by using the filtered white point and outputting, in the color space of the display device, the transformed one or more future frames; and c) selecting the frame following next to the one or more transformed frames as the current frame, and repeating steps a) to c).

2. The method of claim 1, wherein:

in case that, for the selected current frame ($F_{c2}$) of the received sequence of frames, the number of future frames succeeding the current frame in the received sequence is less than the predefined number of future frames, before applying the temporal filter function, predicting, using a white point prediction method, frame specific target white points ($PWP_{c2+2}$, $PWP_{c2+3}$, $PWP_{c2+4}$) for not yet received future frames ($F_{c2+2}$, $F_{c2+3}$, $F_{c2+4}$) up to at least the predefined number of future frames.

3. The method of claim 2, wherein the white point prediction method predicts the frame specific target white points using any of the following methods: image space reprojection, optical flow, white point extrapolation.

4. The method of claim 1, wherein a particular frame-specific target white point is computed by using any one of the following methods: computing the frame-specific target white point as the average color of the respective frame; computing the frame-specific target white point as the maximum color of the respective frame; computing the frame-specific target white point as given by the Retinex theory; computing the frame-specific target white point using local shifts; computing the frame-specific target white point by picture perfect RGB rendering using spectral pre-filtering and sharp color primaries; computing the frame-specific target white point by a robust illumination estimate for chromatic adaptation in rendered images.

5. The method of claim 1, wherein, over the sequence of frames, the weight values associated with white points of past and current frames, and the weight values associated with white points of future frames represent two monotonic functions, respectively, with the same monotonic behavior, and wherein the temporal filter function has a discontinuity between the current frame and the following future frame at which its value jumps in the direction opposite to the monotonic behavior of the two monotonic functions.

6. The method of claim 5, wherein the weights are extracted from the course of adaptation $$f(t) = \sum_{i=0}^{1} N_i e^{-\alpha_i t}, \alpha_i = \frac{\ln(2)}{T_i}$$

with f(t) describing how the white point of a currently observed frame affects the adapted white point in t seconds, and $N_i$ denotes the fraction of influence the exponential has on the adaptation and $T_i$ is the half-life where i=0 refers to fast adaptation, and i=1 refers to slow adaptation, respectively.

7. The method of claim 1, wherein at least one weight value is putting a particular weight on the target white point of at least one corresponding frame in the sliding window.

8. The method of claim 7, wherein the at least one weight value is derived from metadata information encoded in the at least one corresponding frame and the temporal filter function is adjusted accordingly upon receipt of the at least one corresponding frame and updated each time the current frame is advanced.

9. The method of claim 1, wherein the chromatic adaptation transformation is computed by a von Kries transform and operates on tristimulus values in the LMS color space.

10. A computer program product comprising instructions that, when loaded into a memory of a computing device and executed by at least one processor of the computing device, cause the at least one computing device to:

receive a sequence of frames with each frame having input color data associated with each pixel of the respective frame, the input color data being given in a specified color space;

compute for each frame of the received sequence, in the LMS color space, based on the input color data of the respective frame, a frame-specific target white point, wherein the frame-specific target white point is the white point to which the viewer would adapt when watching the particular frame on a display capable of showing all perceivable colors;

select a current frame (Fc) in the frame sequence wherein the current frame represents a current output to the display device;

a) apply a temporal filter function to the target white points of all frames within a sliding window (SW1), the sliding window comprising the current frame (Fcn), a predefined number of past frames preceding the current frame, and a predefined number of future frames succeeding the current frame, to compute, for the frame following the current frame, a filtered white point as weighted sum of all target white points associated with the frames in the sliding window, wherein the temporal filter function defines a weight value for each target white point of the sliding window in that the weight values applied for the past frames and the current frame have the same sign and are set to counteract the adaption to the white points of the past and current frames, and the weight values applied for the future frames have the opposite sign and are set to preventively adapt the viewer's perception of the display white point towards the white points of the future frames;

b) apply a chromatic adaptation transformation to one or more future frames by using the filtered white point and outputting, in the color space of the display device, the transformed one or more future frames; and c) select the frame following next to the one or more transformed frames as the current frame, and repeat steps a) to c).

11. The computer program product of claim 10, wherein: in case that, for the selected current frame ($F_{c2}$) of the received sequence of frames, the number of future frames succeeding the current frame in the received sequence is less than the predefined number of future frames, before applying the temporal filter function, predicting, using a white point prediction method, frame specific target white points ($PWP_{c2+2}$, $PWP_{c2+3}$, $PWP_{c2+4}$) for not yet received future frames ($F_{c2+2}$, $F_{c2+3}$, $F_{c2+4}$) up to at least the predefined number of future frames.

12. The computer program product of claim 11, wherein the white point prediction method predicts the frame specific target white points using any of the following methods: image space reprojection, optical flow, white point extrapolation.

13. The computer program product of claim 10, wherein a particular frame-specific target white point is computed by using any one of the following methods: computing the frame-specific target white point as the average color of the respective frame; computing the frame-specific target white point as the maximum color of the respective frame; computing the frame-specific target white point as given by the Retinex theory; computing the frame-specific target white point using local shifts; computing the frame-specific target white point by picture perfect RGB rendering using spectral pre-filtering and sharp color primaries; computing the frame-specific target white point by a robust illumination estimate for chromatic adaptation in rendered images.

14. The computer program product of claim 10, wherein, over the sequence of frames, the weight values associated with white points of past and current frames, and the weight values associated with white points of future frames represent two monotonic functions, respectively, with the same monotonic behavior, and wherein the temporal filter function has a discontinuity between the current frame and the following future frame at which its value jumps in the direction opposite to the monotonic behavior of the two monotonic functions.

15. The computer program product of claim 14, wherein the weights are extracted from the course of adaptation $$f(t) = \sum_{i=0}^{1} N_i e^{-\alpha_i t}, \alpha_i = \frac{\ln(2)}{T_i}$$

with f(t) describing how the white point of a currently observed frame affects the adapted white point in t seconds, and $N_i$ denotes the fraction of influence the exponential has on the adaptation and $T_i$ is the half-life where i=0 refers to fast adaptation, and i=1 refers to slow adaptation, respectively.

16. A computer system for enhancing the perceived gamut (PG) of a physical display device presenting frames of an image sequence to a human viewer wherein the display gamut (DG) of the display device is given by the primary colors of the display device, the system comprising:

an interface adapted to receive a sequence of frames from an image sequence source with each frame having input color data associated with each pixel of the respective frame, the input color data being given in a specified color space;

a white point computation module adapted to compute for each particular frame of the received image sequence, in the LMS color space, based on the input color data of the respective frame, a frame-specific target white point (TWP), wherein the frame-specific target white point (TWP) is the white point to which the viewer would adapt when watching the particular frame on a display capable of showing all perceivable colors;

a chromatic adaptation transformation module adapted to select a current frame in the frame sequence wherein the current frame represents a current output to the display device, and adapted to iteratively perform the following operations:

a) applying a temporal filter function to the target white points of all frames within a sliding window, the sliding window comprising the current frame, a predefined number of past frames preceding the current frame, and a predefined number of future frames succeeding the current frame, to compute, for the frame following the current frame, a filtered white point as weighted sum of all target white points associated with the frames in the sliding window, wherein the temporal filter function defines a weight value for each target white point of the sliding window in that the weight values applied for the past frames and the current frame have the same sign and are set to counteract the adaption to the white points of the past and current frames, and the weight values applied for the future frames have the opposite sign and are set to preventively adapt the viewer's perception of the display white point towards the white points of the future frames;

b) applying a chromatic adaptation transformation to one or more future frames by using the filtered white point; and c) selecting the frame following next to the one or more transformed frames as the current frame, and repeating steps a) to c); and an output module adapted to output, in the color space of the display device, the transformed one or more future frames.

17. The system of claim 16, further comprising:

a white point prediction module adapted to, in case that for the selected current frame of the received sequence of frames the number of future frames succeeding the current frame in the received sequence is less than the predefined number of future frames, before applying the temporal filter function, predict, using a white point prediction method, frame specific target white points for not yet received future frames up to at least the predefined number of future frames.

18. The system of claim 16, further comprising:

a color space transformation module adapted to transform color data of pixels from a first color space into a second color space.

19. The system of claim 16, wherein, over the sequence of frames, the weight values associated with white points of past and current frames, and the weight values associated with white points of future frames represent two monotonic functions with the same monotonic behavior, and the temporal filter function has a discontinuity between the current frame and the following future frame at which its value jumps in the direction opposite to the monotonic behavior of the two monotonic functions.

20. The system of claim 16, wherein at least one weight value of the temporal filter function is putting a particular weight on the target white point of at least one corresponding frame in the sliding window and the at least one weight value is encoded in the at least one corresponding frame, with the chromatic adaptation transformation module being adapted to adjust the temporal filter function accordingly upon receipt of the at least one corresponding frame.

* * * * *